US008710798B2

(12) United States Patent
Turner

(10) Patent No.: US 8,710,798 B2
(45) Date of Patent: Apr. 29, 2014

(54) ELECTRIC VEHICLE CHARGING STATION PARKING METER SYSTEMS

(75) Inventor: Dexter Turner, West Linn, OR (US)

(73) Assignee: Optimization Technologies, Inc., Beaverton, OR (US)

(*) Notice: Subject to any disclaimer, the term of this patent is extended or adjusted under 35 U.S.C. 154(b) by 237 days.

(21) Appl. No.: 13/070,389

(22) Filed: Mar. 23, 2011

(65) Prior Publication Data

US 2011/0213656 A1  Sep. 1, 2011

Related U.S. Application Data

(63) Continuation-in-part of application No. 13/033,179, filed on Feb. 23, 2011, which is a continuation-in-part of application No. 12/954,209, filed on Nov. 24, 2010.

(60) Provisional application No. 61/307,318, filed on Feb. 23, 2010, provisional application No. 61/409,108, filed on Nov. 1, 2010, provisional application No. 61/307,377, filed on Feb. 23, 2010, provisional application No. 61/353,944, filed on Jun. 11, 2010, provisional application No. 61/317,181, filed on Mar. 24, 2010.

(51) Int. Cl.
*H02J 7/00* (2006.01)
*H02J 7/14* (2006.01)

(52) U.S. Cl.
USPC .......................................... 320/109; 320/104

(58) Field of Classification Search
CPC ... Y02T 90/14; Y02T 10/7005; Y02T 90/166; Y02T 90/167
USPC ....................................................... 320/109
See application file for complete search history.

(56) References Cited

U.S. PATENT DOCUMENTS

| 4,532,418 | A | 7/1985 | Meese et al. |
| 5,202,617 | A | 4/1993 | Nor |
| 5,306,999 | A | 4/1994 | Hoffman |
| 5,327,066 | A | 7/1994 | Smith |
| 5,369,352 | A | 11/1994 | Toepfer et al. |
| 5,821,731 | A * | 10/1998 | Kuki et al. ..................... 320/108 |
| 6,225,776 | B1 | 5/2001 | Chai |
| 6,727,809 | B1 | 4/2004 | Smith |
| 7,256,516 | B2 | 8/2007 | Buchanan et al. |
| 7,956,570 | B2 * | 6/2011 | Lowenthal et al. ........... 320/104 |

(Continued)

FOREIGN PATENT DOCUMENTS

| WO | WO 2009/091745 | 7/2009 |
| WO | WO 2010/011545 | 1/2010 |
| WO | WO 2010/051477 | 5/2010 |

*Primary Examiner* — M'Baye Diao
(74) *Attorney, Agent, or Firm* — Klarquist Sparkman, LLP

(57) ABSTRACT

Disclosed herein are representative embodiments of methods, apparatus, and systems relating to electric vehicle charging stations ("EVCS s") or electric vehicle supply equipment ("EVSE") that are configured to provide parking meter functionality. Embodiments of the disclosed technology can be used to improve the basic process of connecting an electric vehicle to the power grid with an EVCS/EVSE for charging purposes by also providing a means of parking access control for vehicles parked near the EVCS/EVSE in spaces managed by the EVCS/EVSE. The parking meter system enables installers and/or operators of EVCSs/EVSE to reduce equipment costs by eliminating the need to have separate parking meters in addition to EVCS/EVSE. This can potentially lead to an increase in the number of EVCSs/EVSE that are installed and in the speed with which these EVCSs/EVSE are installed.

54 Claims, 16 Drawing Sheets

(56) References Cited

U.S. PATENT DOCUMENTS

| | | |
|---|---|---|
| 2004/0233055 A1 | 11/2004 | Canich et al. |
| 2009/0287578 A1 | 11/2009 | Paluszek et al. |
| 2009/0313032 A1 | 12/2009 | Hafner et al. |
| 2010/0010698 A1* | 1/2010 | Iwashita et al. ............... 701/22 |
| 2010/0013434 A1 | 1/2010 | Taylor-Haw et al. |
| 2010/0013436 A1* | 1/2010 | Lowenthal et al. .......... 320/109 |
| 2010/0039067 A1 | 2/2010 | Hill et al. |
| 2010/0161481 A1* | 6/2010 | Littrell ............................ 705/40 |
| 2010/0181959 A1 | 7/2010 | Gibbs et al. |
| 2010/0213896 A1 | 8/2010 | Ishii et al. |
| 2011/0106329 A1* | 5/2011 | Donnelly et al. ............. 700/291 |
| 2011/0140656 A1 | 6/2011 | Starr et al. |
| 2011/0169447 A1 | 7/2011 | Brown et al. |
| 2011/0204847 A1 | 8/2011 | Turner |
| 2011/0238861 A1 | 9/2011 | Hutchinson |
| 2011/0239116 A1 | 9/2011 | Turner et al. |
| 2011/0258112 A1* | 10/2011 | Eder et al. ...................... 705/39 |

* cited by examiner

2000

ELECTRIC VEHICLE CHARGING STATION PARKING METER SYSTEMS

CROSS-REFERENCE TO RELATED APPLICATIONS

This application is a continuation-in-part of U.S. Nonprovisional application Ser. No. 13/033,179, filed on Feb. 23, 2011, and entitled "ELECTRIC VEHICLE CHARGING STATIONS WITH TOUCH SCREEN USER INTERFACE," which is a continuation-in-part of U.S. Nonprovisional application No. 12/954,209, filed on Nov. 24, 2010, and entitled "ELECTRIC VEHICLE CHARGING STATION ADVERTISING SYSTEMS", which claims the benefit of U.S. Provisional Application No. 61/307,318, filed on Feb. 23, 2010, and entitled "ELECTRIC VEHICLE CHARGING STATION WITH TOUCH SCREEN USER INTERFACE"; U.S. Provisional Application No. 61/409,108, filed on Nov. 1, 2010, and entitled "ELECTRIC VEHICLE CHARGING STATION WITH TOUCH SCREEN USER INTERFACE"; U.S. Provisional Application No. 61/307,377, filed on Feb. 23, 2010, and entitled "ELECTRIC VEHICLE CHARGING STATION ADVERTISING SYSTEM"; U.S. Provisional Application No. 61/353,944, filed on Jun. 11, 2010, and entitled "ELECTRIC VEHICLE CHARGING STATION ADVERTISING SYSTEM"; and U.S. Provisional Application No. 61/317,181, filed on Mar. 24, 2010, and entitled "ELECTRIC VEHICLE CHARGING STATION PARKING METER SYSTEM", all of which are hereby incorporated herein by reference.

FIELD

This application relates to electric vehicle charging stations and associated systems.

SUMMARY

Disclosed below are representative embodiments of methods, apparatus, and systems relating to electric vehicle charging stations ("EVCS s") and electric vehicle supply equipment ("EVSE"). The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

Among the embodiments disclosed herein are electric vehicle charging station parking meter systems that can enable an EVCS/EVSE to also function as a parking meter. Embodiments of the disclosed technology can be used to improve the basic process of connecting an electric vehicle to the power grid with an EVCS/EVSE for charging purposes by also providing a means of parking access control for vehicles parked near the EVCS/EVSE. The parking meter system enables installers and/or operators of EVCSs/EVSE to reduce equipment costs by eliminating the need to have separate parking meters in addition to EVCS/EVSE. This can potentially lead to an increase in the number of EVCSs/EVSE that are installed and in the speed with which these EVCSs/EVSE are installed. More charging equipment will therefore be available faster to support the deployment of electric vehicles. In certain embodiments of the disclosed technology, electric vehicle drivers can also pay for parking at the same time as they access the EVCS/EVSE to charge their electric vehicles. Drivers of non-electic vehicles can also use the EVCS/EVSE to pay for parking their vehicles.

Embodiments of the disclosed technology provide parking authorization functionality on an EVCS/EVSE using one or more methodologies, including, for example, any one or more of: the use of a graphical user interface displayed on the EVCS/EVSE touch screen display apparatus to authorize parking in spaces served by the EVCS/EVSE, the use of a text-only display apparatus and numerical or alpha-numeric keypad in the EVCS/EVSE to authorize parking in spaces served by the EVCS/EVSE, the use of a printer integrated into the EVCS/EVSE to print paper receipts which can be displayed in vehicles parked in spaces served by the EVCS/EVSE, the use of a touch screen or textual display apparatus in the EVCS/EVSE to display the status of parking authorizations so that parking enforcement personnel can determine which vehicles are currently authorized to park in these spaces or any combination, subcombination, or hybrid of the aforementioned methodologies.

The parking authorization can be done using a variety of methods. For example, the EVCS/EVSE display apparatus can be used to display a graphical user interface that allows drivers of electric vehicles using the EVCS/EVSE to replenish their vehicle's battery and to pay for parking at the same time as they complete the process of authenticating their authorization to use the EVCS/EVSE. Drivers of non-electric vehicles who wish to park in the area served by the EVCS/EVSE with parking authorization functionality can also use this graphical user interface to pay for parking. The EVCS/EVSE can be equipped with a printer to print paper receipts which can be affixed to the vehicle window or placed on the vehicle dash so that they can be viewed by parking enforcement personnel. For an EVCS/EVSE not equipped with a printer, parking enforcement personnel can use the graphical user interface to view the current status of all parking spaces served by the EVCS/EVSE to determine which vehicles are currently authorized to park.

Some of the disclosed embodiments are further configured to display advertising on the display apparatus of the EVCS or EVSE (e.g., advertisements for entities other than the EVCS/EVSE operator). The advertising system enables EVCS/EVSE parking system operators, EVCS/EVSE installers, and/or manufacturers of EVCSs/EVSE to generate advertising revenue with the EVCS/EVSE, which can potentially lead to an increase in the number of EVCSs/EVSE that are installed and in the speed with which these EVCSs/EVSE are installed. Consequently, more charging equipment can be made available to electric vehicle owners, promoting faster deployment of the vehicles. In certain embodiments of the disclosed technology, advertising is displayed to the charging station users or passers-by via a suitable display device (e.g., a liquid-crystal display ("LCD") screen, a light emitting diode ("LED") screen, plasma screen, or other display apparatus installed in the EVCS/EVSE). In some embodiments, the display device further includes a touch screen to facilitate user interaction.

Embodiments of the disclosed technology display various types of advertising at an EVCS/EVSE including, for example, any one or more of: advertising which appears on all or a portion of the EVCS/EVSE display apparatus to pedestrians passing by the EVCS/EVSE; advertising which appears on all or a portion of the EVCS/EVSE display apparatus in response to a user interacting with the EVCS/EVSE; advertising which appears on all or a portion of the EVCS/EVSE display apparatus based upon the identity of the user interacting with the EVCS/EVSE; advertising which appears on all or a portion of the EVCS/EVSE based at least in part on a recognition by the EVCS/EVSE of the make, model, year of manufacture, installed accessories, or other characteristic of a vehicle which has been connected to the EVCS/EVSE for charging; advertising which appears on all or a portion of the EVCS/EVSE display apparatus based on the time-of-day, day of the week, a specific date, or other chronological reference; advertising which appears on all or a portion of the EVCS/EVSE display apparatus based on the outside air temperature, precipitation status, or other meteorological factors; or advertising which appears on all or a portion of the EVCS/EVSE display apparatus based on any combination, subcombination, or hybrid of the aforementioned factors.

The advertising can be displayed in a variety of forms. For example, the advertising can be displayed as any one or more of the following: a banner or box advertisement (e.g., an advertisement in a dedicated box on the screen) which is displayed in an area of the EVCS/EVSE display apparatus dedicated for the display of advertising, still images, motion pictures, video clips, audio clips, commercials of various running times, interactive computer software applications which request and accept user input, or any combination, subcombination, or hybrid of the aforementioned formats.

In certain embodiments, the advertising is controlled by software executed locally at the EVCS/EVSE. In other embodiments, the advertising is controlled remotely by software executed by a remote server (e.g., a back office server) configured to communicate with the EVCS/EVSE (e.g., via a wired or wireless communication network). The software controlling the advertising can control which advertising is displayed, in which order, and for how long. In certain embodiments, the viewer of the advertising is prompted to input information or to otherwise interact with the currently displayed advertising. This input can be processed and used to enhance the viewer's experience with the EVCS/EVSE by allowing the advertising to be specially tailored for the viewer.

Among the embodiments disclosed herein is a method of operating an EVCS or EVSE that comprises receiving an indication at the EVCS or EVSE of a parking space at which a user of the EVCS or EVSE desires to park, and determining if the parking space indicated by the user is associated with an electric vehicle charging port. If the parking space indicated by the user is associated with an electric vehicle charging port, a determination is made as to whether the user is authorized to use the EVCS or EVSE, and, if the user is authorized to use the EVCS or EVSE, a charging operation is controlled that provides an electric charge via the electric vehicle charging port. If the parking space indicated by the user is not associated with an electric vehicle charging port, a determination is made as to whether the user is authorized to use the parking space, and the user is provided with an indication that the user is authorized to use the parking space. In certain implementations, the act of receiving the indication of the desired parking space comprises receiving the indication via a touch screen interface associated with a display device of the EVCS or EVSE. In some implementations, the method further comprises displaying graphical depictions of parking spaces managed by the EVCS or EVSE on a display device of the EVCS or EVSE, and the act of receiving comprises receiving data indicating user interaction with one of the graphical depictions via a touch screen interface associated with the display device. In certain implementations, the act of determining whether the user is authorized to use the EVCS or EVSE comprises receiving account information from the user, accessing user data stored locally at the EVCS or EVSE, and determining that the user is authorized to use the EVCS or EVSE by using the account information to identify the user as an authorized user from the user data. In some implementations, the act of determining whether the user is authorized to use the EVCS or EVSE comprises receiving account information from the user, transmitting at least a portion of the account information to a remote server, and receiving a response from the remote server. The account information can be either credit card account information or account information indicating that the user is a member of a network of authorized users. In certain implementations, the act of determining whether the user is authorized to use the parking space comprises receiving an indication of a period for which the user desires to park, receiving account information from the user, accessing user data stored locally at the EVCS or EVSE, and determining that the user is authorized to use the parking space by using the account information and the indication of the period to identify the user as an authorized user from the user data. In some implementations, the act of determining whether the user is authorized to use the parking space comprises receiving an indication of a period for which the user desires to park, receiving account information from the user, determining a cost for parking for the desired period using locally stored parking rate information, and transmitting the cost for parking and at least a portion of the account information to a remote server. The account information can be either credit card account information or account information indicating that the user is a member of a network of authorized users. In certain implementations, the act of providing the user with the indication that the user is authorized to use the parking space comprises printing a receipt at the EVCS or EVSE, the receipt indicating that the user is authorized to use the parking space for the desired period. In some implementations, the act of controlling the charging operation comprises receiving account information from the user, detecting an unplug event at the parking space, determining a time of the unplug event, computing a cost for parking and charging at the parking space based at least in part on the time of the unplug event, and transmitting the cost for parking and charging at the parking space and at least a portion of the account information to a remote server. In certain implementations, the method further comprises displaying one or more advertisements on a display device of the EVCS or EVSE as the EVCS or EVSE awaits user interaction. In some implementations, the method further comprises receiving payment method information from the user; selecting one or more targeted advertisements for display on a display device of the EVCS or EVSE, the one or more targeted advertisements being selected based at least in part on the payment method information; and displaying the one or more targeted advertisements on the display device of the EVCS or EVSE.

Another disclosed embodiment is an EVCS or EVSE comprising a charging port configured to be coupled to an electric vehicle and to charge one or more batteries of the electric vehicle, a display device, a computer processor, and one or more non-transitory computer-readable media storing computer-executable instructions. In this embodiment, the computer-executable instructions include instructions for causing the display device to display: (a) an interactive parking space selection screen by which an available parking space is selectable; (b) an interactive parking duration selection screen by which a duration for parking in the available parking space is selectable; (c) an interactive authorization selection screen by which a method for authorizing the parking in the available parking space is selectable; and/or (d) an authorization accepted screen indicating that parking in the available parking space is authorized. In certain implementations, the display device comprises a touch screen interface. In some implementations, the interactive parking space selection screen includes graphical depictions of a plurality of available parking spaces, at least some of the graphical depictions indicating that an associated parking space has a respective charging port for charging an electric vehicle. In certain implementations, the computer-executable instructions further include instructions for causing the interactive authorization selection screen to request an authorization method from a user from among a plurality of possible authorization methods. The possible authorization methods can comprise at least a credit card authorization and a network membership authorization. In some implementations, the computer-executable instructions further include instructions for causing transmission of user identification information to a remote server, and processing data received from the remote server in response to the transmission, the data received being indicative of whether parking in the available parking space is authorized. In certain implementations, the EVCS or EVSE further comprises a printer, and the computer-executable instructions, when executed by the computer processor, cause the printer to print a receipt indicating that parking at the available parking space is authorized for the duration selected by a user. In some implementations, the user identification information is credit card information for a user, and the data received from the remote server indicates that a credit card charge for the user has been authorized by the remote server. In certain implementations, the data received from the remote server indicates that a user is a member of a network of authorized users, and the computer-executable instructions, when executed by the computer processor, cause transmission of the duration for parking selected by the user. In some implementations, the computer-executable instructions, when executed by the computer processor, cause one or more advertisements to be displayed on the display device. The advertisements can be selected advertisements targeting a user of the EVCS or EVSE based on information received from the user from the interactive authorization selection screen. In certain implementations, the computer-executable instructions, when executed by the computer processor, cause the display device to display an interactive receipt request screen by which a receipt for the parking in the available parking space is requestable. Further, the computer-executable instructions can, when executed by the computer processor, cause the receipt for the parking in the available parking space to be emailed to the user upon request.

Another embodiment disclosed herein is a computer-implemented method that comprises receiving user account data from an EVCS or EVSE in a system of EVCSs or EVSE; accessing a user database; based on at least a portion of the account information, determining from the user database that a user associated with the account information is authorized to use the EVCS or EVSE; transmitting authorization data to the EVCS or EVSE, the authorization data indicating that the user is authorized to use the EVCS or EVSE; receiving from the EVCS or EVSE an indication of a parking fee to be charged to the user; and updating the user database to account for the parking fee. In some implementations, the method further includes receiving from the EVCS or EVSE an indication of energy used by the user at the EVCS or EVSE, computing an electric vehicle charging fee based at least in part on the indication of energy used by the user, and updating the user database to account for the electric vehicle charging fee. In certain implementations, the method further includes receiving from the EVCS or EVSE an indication of an electric vehicle charging fee to be charged to the user, and updating the user database to account for the electric vehicle charging fee.

Yet another embodiment disclosed herein comprises a computer-implemented method that comprises receiving user account data from an EVCS or EVSE in a system of EVCSs or EVSE; accessing a user database; based on at least a portion of the account information, determining from the user database that a user associated with the account information is authorized to park at a parking space managed by the EVCS or EVSE; transmitting authorization data to the EVCS or EVSE, the authorization data indicating that the user is authorized to park at the parking space managed by the EVCS or EVSE. In some implementations, the method further comprises receiving from the EVCS or EVSE an indication of a parking fee to be charged to the user, and updating the user database to account for the parking fee.

Another embodiment disclosed herein is a computer-implemented method that comprises receiving parking rate data from a user, the parking rate data comprising one or more parking rates to be charged by one or more EVCSs or EVSE in a system of EVCSs or EVSE; and causing the parking rate data to be transmitted to the one or more EVCS or instances of EVSE. In some implementations, the one or more EVCS or instances of EVSE are a subset of the EVCSs or EVSE in the system of EVCSs or EVSE. In certain implementations, the parking rate data further comprises identification data for identifying one or more EVCSs or instances of EVSE which are to use the one or more parking rates.

Embodiments of the disclosed systems and methods can be implemented using computing hardware, such as a computer processor embedded in the EVCS/EVSE. For example, embodiments of the disclosed methods can be performed using software stored on one or more non-transitory computer-readable media (e.g., one or more optical media discs, volatile memory components (such as DRAM or SRAM), or nonvolatile memory or storage components (such as hard drives)). Such software can be executed by one or more computer processors embedded in the EVCS/EVSE or by one or more computers coupled to the EVCS/EVSE by a network (e.g., via the Internet, a wide-area network, a local-area network, a client-server network, or other such network). Embodiments of the disclosed methods can also be performed by specialized computing hardware (e.g., one or more application specific integrated circuits ("ASICs") or programmable logic devices (such as field programmable gate arrays ("FPGAs")) configured to perform any of the disclosed methods. Additionally, any intermediate or final result created or modified using any of the disclosed methods can be stored on a non-transitory storage medium (e.g., one or more optical media discs, volatile memory or storage components (such as DRAM or SRAM), or nonvolatile memory or storage components (such as hard drives)). Furthermore, any of the software embodiments (comprising, for example, computer-executable instructions which when executed by a computer cause the computer to perform any of the disclosed methods) or results (either intermediate or final) created or modified by the disclosed methods can be transmitted, received, or accessed through a suitable communication means.

The foregoing and other objects, features, and advantages of the invention will become more apparent from the following detailed description, which proceeds with reference to the accompanying figures.

DETAILED DESCRIPTION

I. General Considerations

Figure 1:
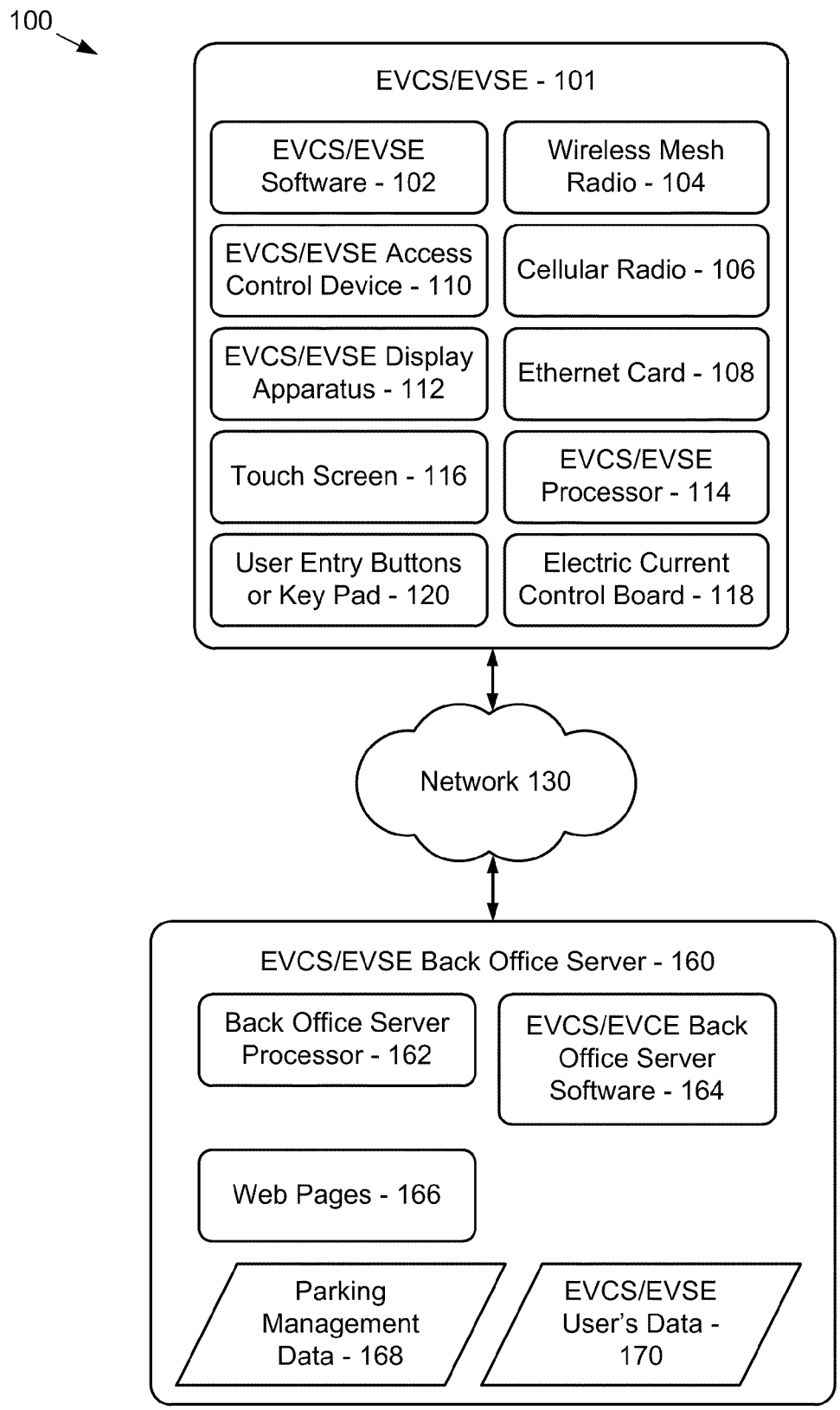
FIG. 1 is a schematic block diagram illustrating an exemplary electric vehicle charging system with a display device suitable for parking functions.

Disclosed below are representative embodiments of methods, apparatus, and systems for using and operating electric vehicle charging stations ("EVCS s") or electric vehicle supply equipment ("EVSE"). The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used in various combinations and subcombinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "monitor" to describe the disclosed methods. These terms are high-level abstractions of the actual operations that are performed. The actual operations that correspond to these terms may vary depending on the particular implementation and are readily discernible by one of ordinary skill in the art. Furthermore, as used herein, the term "and/or" means any one item or combination of items in the phrase.

Any of the disclosed methods can be implemented using computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives)) and executed on a computer (e.g., any commercially available computer or a computer processor embedded in the EVCS/EVSE). Any of the intermediate or final data created and used during implementation of the disclosed methods or systems can also be stored on one or more computer-readable media (e.g., non-transitory computer-readable media) and are considered to be within the scope of the disclosed technology.

For clarity, only certain selected aspects of the software-based embodiments are described. Other details that are well known in the art are omitted. For example, it should be understood that the software-based embodiments are not limited to any specific computer language or program. For instance, embodiments of the disclosed technology can be implemented by software written in C++, C#, Objective C, Java, Perl, JavaScript, Adobe Flash, or any other suitable programming language Likewise, embodiments of the disclosed technology are not limited to any particular computer or type of hardware. Details of suitable computers and hardware are well known and need not be set forth in detail in this disclosure.

Furthermore, any of the software-based embodiments (comprising, for example, computer-executable instructions stored on a non-transitory computer-readable medium) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

The disclosed methods can also be implemented using specialized computing hardware that is configured to perform any of the disclosed methods. For example, the disclosed methods can be implemented by an integrated circuit (e.g., an application specific integrated circuit ("ASIC") or programmable logic device ("PLD"), such as a field programmable gate array ("FPGA")) specially designed to implement any of the disclosed methods. The integrated circuit or specialized computing hardware can be embedded in or directly coupled to an EVCS/EVSE or device that is configured to interact with the EVCS/EVSE.

Figure 21:
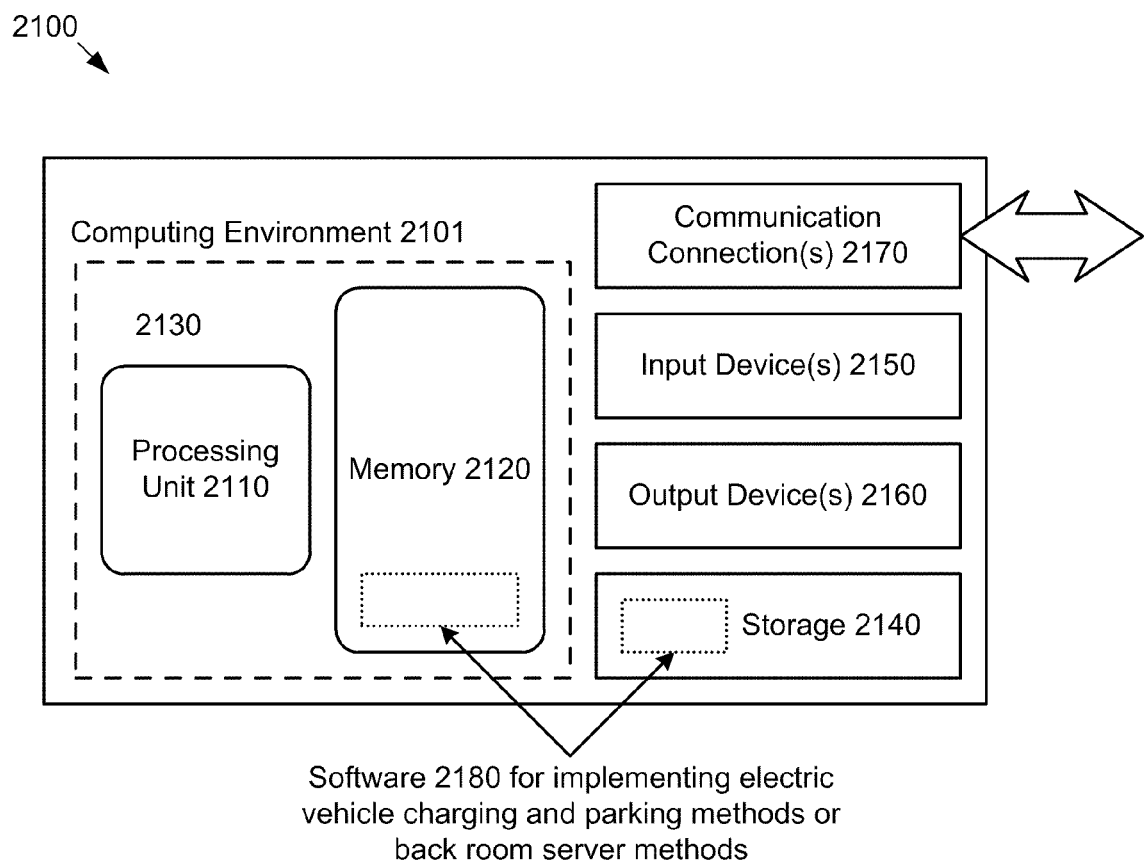
FIG. 21 is a schematic block diagram of an exemplary computing environment that can be used to implement embodiments of the disclosed technology.

FIG. 21 is a schematic block diagram 2100 that illustrates a generalized example of a suitable computing hardware environment 2101 in which embodiments of the disclosed technology can be implemented. The computing hardware environment 2101 is not intended to suggest any limitation as to the scope of use or functionality of the disclosed technology, as the technology can be implemented in diverse general-purpose or special-purpose computing environments.

With reference to FIG. 21, the computing hardware environment 2101 includes at least one processing unit 2110 and memory 2120. In FIG. 21, this most basic configuration 2130 is included within a dashed line. The processing unit 2110 executes computer-executable instructions. In a multi-processing system, multiple processing units execute computer-executable instructions to increase processing power. The memory 2120 may be volatile memory (e.g., registers, cache, RAM, DRAM, SRAM), non-volatile memory (e.g., ROM, EEPROM, flash memory), or some combination of the two. The memory 2120 can store software 2180 for implementing one or more of the described techniques for operating or using the disclosed electric vehicle charging systems. For example, the memory 2120 can store software 2180 for implementing any of the disclosed methods and their accompanying user interfaces.

The computing hardware environment can have additional features. For example, the computing hardware environment 2101 includes storage 2140, one or more input devices 2150, one or more output devices 2160, and one or more communication connections 2170. An interconnection mechanism (not shown) such as a bus, controller, or network interconnects the components of the computing hardware environment 2101. Typically, operating system software (not shown) provides an operating environment for other software executing in the computing hardware environment 2101, and coordinates activities of the components of the computing hardware environment 2101.

Storage 2140 is a type non-volatile memory and can be removable or non-removable. The storage 2140 includes, for instance, magnetic disks (e.g., hard drives), magnetic tapes or cassettes, optical storage media (e.g., CD-ROMs or DVDs), or any other tangible non-transitory storage medium which can be used to store information and which can be accessed within or by the computing hardware environment 2101. The storage 2140 can store the software 2180 for implementing any of the described techniques, systems, or environments.

The input device(s) 2150 can be a touch input device such as a keyboard, mouse, touch screen, pen, trackball, a voice input device, a scanning device, an RFID reader, or another device that provides input to the computing environment 2101. The output device(s) 2160 can be a display, touch screen, printer, speaker, or another device that provides output from the computing environment 2101.

The communication connection(s) 2170 enable communication over a communication medium to another computing entity. The communication medium conveys information such as computer-executable instructions, any of the intermediate or final messages or data used in implementing embodiments of the disclosed technology, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier. For example, the communication connection(s) 2170 can communicate with another computing entity over a wired or wireless network (e.g., the Internet, a wide-area network, a local-area network, a Wi-Fi network, a client-server network, a wireless mesh network, or other such network or any combination thereof).

The various methods, systems, and interfaces disclosed herein can be described in the general context of computer-executable instructions stored on one or more computer-readable media. Computer-readable media are any available media that can be accessed within or by a computing environment. By way of example, and not limitation, with the computing hardware environment 2101, computer-readable media include tangible non-transitory computer-readable media such as memory 2120 and storage 2140. The various methods, systems, and interfaces disclosed herein can also be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

II. Exemplary Embodiments of the EVCS/EVSE Parking Meter Systems

FIG. 1 is a schematic block diagram illustrating an EVCS/EVSE computing hardware environment 100 for implementing embodiments of the disclosed technology. In particular, FIG. 1 illustrates an exemplary computing hardware environment 100 for an EVCS/EVSE and an exemplary computing hardware environment 160 for an EVCS/EVSE back office server. The EVCS/EVSE environment 100 is more specialized than computing hardware environment 2100 but should not be construed as limiting the types of hardware that can be used to implement the disclosed technology. Furthermore, the EVCS/EVSE environment 100 can include any of the components described above with respect to the general computing hardware environment 2100.

The EVCS/EVSE computing hardware environment 100 includes software 102, which comprises computer-executable instructions stored on non-transitory computer-readable media (e.g., any one or more of the non-transitory computer-readable media described above). When executed, the software can be used to implement the functionality of the EVCS/EVSE, which is described in more detail below. The EVCS/EVSE computing hardware environment 100 further comprises an EVCS/EVSE processor 114 for executing the software 102. Suitable processors and associated parts can be obtained, for example, from Parvus Corporation. In the illustrated embodiment, the EVCS/EVSE processor 114 is interconnected to an electric current control board 118. Suitable electric current control boards and associated parts can be obtained, for example, from Texas Instruments, Riley Corp, and National Control Devices. In certain exemplary embodiments, the EVCS/EVSE software 102 is used to implement a process in which commands and data are exchanged to control the flow of electrical current between one or more electric vehicles plugged into one or more respective ports of the EVCS/EVSE (e.g., the EVCS/EVSE 240 shown in FIG. 2) and the power grid (e.g., the power grid 270 shown in FIG. 2). The ports of the EVCS/EVSE can comprise, for example, 120 V AC receptacles, 240 V AC receptacles, SAE J1772™ vehicle charging connectors, IEC 62196 electrical connectors, or combinations thereof. The EVCS/EVSE computing hardware environment 100 can also include a wireless mesh radio 104, a cellular radio 106 and/or an Ethernet card 108 to provide the environment 100 with a number of wired and wireless interface capabilities for exchanging data with, for example, an EVCS/EVSE back office server 160. Suitable wireless mesh radios and associated parts can be obtained, for example, from Digi International. Suitable cellular radios and associated parts can be obtained, for example, from Telit. In the illustrated embodiment, the EVCS/EVSE processor 114 includes Ethernet functionality. The EVCS/EVSE computing hardware environment 100 also includes an access control device 110, such as a magnetic card reader or radio frequency identity ("RFID") reader, and a display apparatus 112, such as an LCD, LED, or plasma screen with a touch screen interface 116. Another option to facilitate user interaction is using a display apparatus without a touch screen interface but with a set of user entry buttons or a keypad 120. Suitable magnetic card readers and associated parts can be obtained, for example, from ID Tech. Suitable display apparatus and touch screen interfaces can be obtained, for example, from Logic Supply. As shown in FIG. 1, the EVCS/EVSE computing hardware environment 100 is coupled to the EVCS/EVSE back office server environment 160 via a network 130 (e.g., the Internet, a wide-area network, a local-area network, a client-server network, a wireless mesh network, or other such network or any combination thereof).

Figure 19:
FIG. 19 is an image of an exemplary EVCS/EVSE having a display device suitable for parking meter functionality and/or advertising functionality in accordance with embodiments of the disclosed technology.

FIG. 19 is an image of an EVCS/EVSE 1900 in which the EVCS/EVSE environment 100 is implemented. As shown in FIG. 19, the display apparatus is desirably located in a position that allows for easy viewing by a user.

The back office server environment 160 can be implemented using a wide variety of commercially available computers and/or servers. In FIG. 1, the back office server environment 160 includes back office server software 164, which can comprise computer-executable instructions stored on non-transitory computer-readable media (e.g., any one or more of the non-transitory computer-readable media described above). When executed, the software can be used to implement the functionality of the back office server, which is described in more detail below. The EVCS/EVSE back office server 160 further comprises a back office server processor 162 for executing software 164. Also shown in FIG. 1 is EVSC/EVSE user data 170. The EVSC/EVSE user data 170 can comprise data stored on non-transitory computer-readable media that is related to users of the EVCS/EVSE. For example, the data can include data about a user's identification, address, account, usage history, vehicle, and/or other such user data. In the illustrated embodiment, the EVCS/EVSE back office server 160 further includes parking management data 168. Parking management data 168 can comprise one or more of an identifier for each parking space (e.g. parking space #1), the geographic location of parking spaces served by the EVCS/EVSEs, or the payment status of these parking spaces (e.g. not paid for parking or paid for parking until 03:32 pm on today's date). Furthermore, the EVCS/EVSE back office server 160 includes web page data 166. The web page data 166 can comprise data stored on non-transitory computer-readable media that is used to render one or more web pages for display to parking enforcement personnel (e.g., parking enforcement 200 shown in FIG. 2) via a web site (e.g., web site 210 shown in FIG. 2). The web page data 166 can include other data used to implement the web site. The parking enforcement web site can allow parking enforcement personnel to view the current payment status of one or more parking spaces served by the EVCS/EVSEs. The parking management web site and its associated web pages can be displayed, for example, using a suitable Internet browser or media player implemented at a computer operated by parking enforcement personnel and coupled to the back office server 120 via a network (e.g., the Internet, a wide-area network, a local-area network, a client-server network, a wireless mesh network, or other such network or any combination thereof). The web page data 166 can be in any format or language suitable for implementing web pages (e.g., HTML, Flash, Java, and the like). In other embodiments, the data to be displayed to the parking enforcement personnel is not stored as web page data, but as data usable via a non-web-based user interface.

Figure 2:
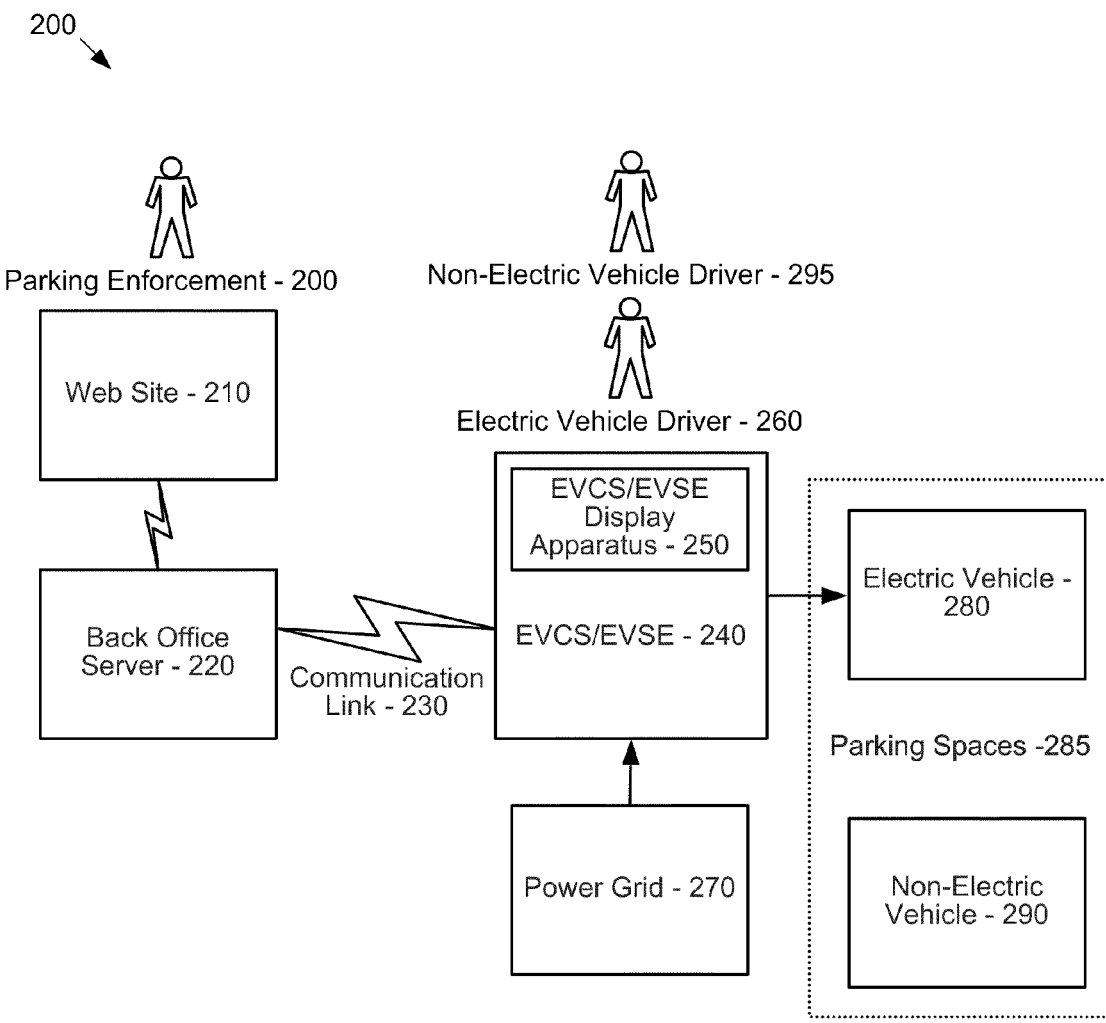
FIG. 2 is a schematic block diagram illustrating an exemplary EVCS/EVSE system with parking meter functionality and the users of the exemplary system.

FIG. 2 is a schematic block diagram illustrating an exemplary EVCS/EVSE system having parking meter functionality and the users of the exemplary system. In FIG. 2, the back office server 220 communicates to one or more EVCSs/EVSEs 240 via a communication link 230 (which may be wired or wireless) to transfer parking management data (e.g., parking management data 168) to the EVCSs/EVSEs. For example, the EVCS/EVSE 240 can use a communication device (e.g., one or more of the wireless mesh radio 104, cellular radio 106, or Ethernet card 108 shown in FIG. 1) to establish the communication link 230 with the back office server 220. As noted above, the functionality of the EVCS/EVSE can be implemented by executing appropriate EVCS/EVSE software stored at the EVCS/EVSE (e.g., EVCS/EVSE software 102). The functionality of the back office server 220 can be implemented by executing appropriate back office software stored at the back office server 220 (e.g., back office server software 124). The parking management data that is transmitted can comprise, for example, the parking space identifiers, parking rates, payment status, or other data about the parking spaces served by a respective EVCS/EVSE (e.g. parking spaces 285). Any of the parking management data can be displayed to one or more parking enforcement persons 200 via an EVCS/EVSE display apparatus 250 or web site 210 (e.g., after the parking enforcement person inputs an appropriate identification code). Once the parking management data is received by the EVCS/EVSE 240, it is stored in a computer-readable medium at the EVCS/EVSE (e.g., any of the tangible non-transitory computer-readable media discussed above, such as volatile or non-volatile memory) and used to compute parking charges to assess electric vehicle drivers (such as electric vehicle driver 260) and non-electric vehicle drivers (such as non-electric vehicle driver 295) who are using the EVCS/EVSE and its display apparatus 250 to pay for parking (and for vehicle battery recharging in the case of electric vehicle drivers 260). Electric vehicle drivers 260 and non-electric vehicle drivers 295 can interact with the EVCS/EVSE 240 using the EVCS/EVSE display apparatus 250 (e.g., to make selections and/or enter information) to pay for parking of electric vehicles (such as electric vehicle 280) and non-electric vehicles (such as non-electric vehicle 290) that are parked in the parking spaces 285 served by the EVCS/EVSE. For example, the display apparatus can be equipped with a touch screen (e.g., touch screen 116). If the EVCS/EVSE 240 does not have a touch screen equipped display, electric vehicle drivers 260 and non-electric vehicle drivers 295 can interact with the EVCS/EVSE 240 using buttons or a keypad (e.g., user entry buttons or key pad 120) to make selections and enter information. Data associated with the electric vehicle driver 260 and non-electric vehicle driver 295 interactions with the EVCS/EVSE can be transmitted back to the back office server 220 via the communication link 230 so that the back office software 220 can update the parking management data 168 including the payment status of the parking spaces 285 served by the EVCS/EVSEs.

Also shown in FIG. 2 is parking enforcement personnel 200, who can access, create, upload, and/or modify any one or more aspects of the parking management data 168, such as the parking rates, via a web site 210 or by accessing and modifying information directly at the EVCS/EVSE. In certain embodiments, an EVCS/EVSE operator can also access, create, upload, and/or modify any of the parking management data 168, such as the parking rates, via a web site 210 or by accessing and modifying information directly at the EVCS/EVSE.

Figure 3A:
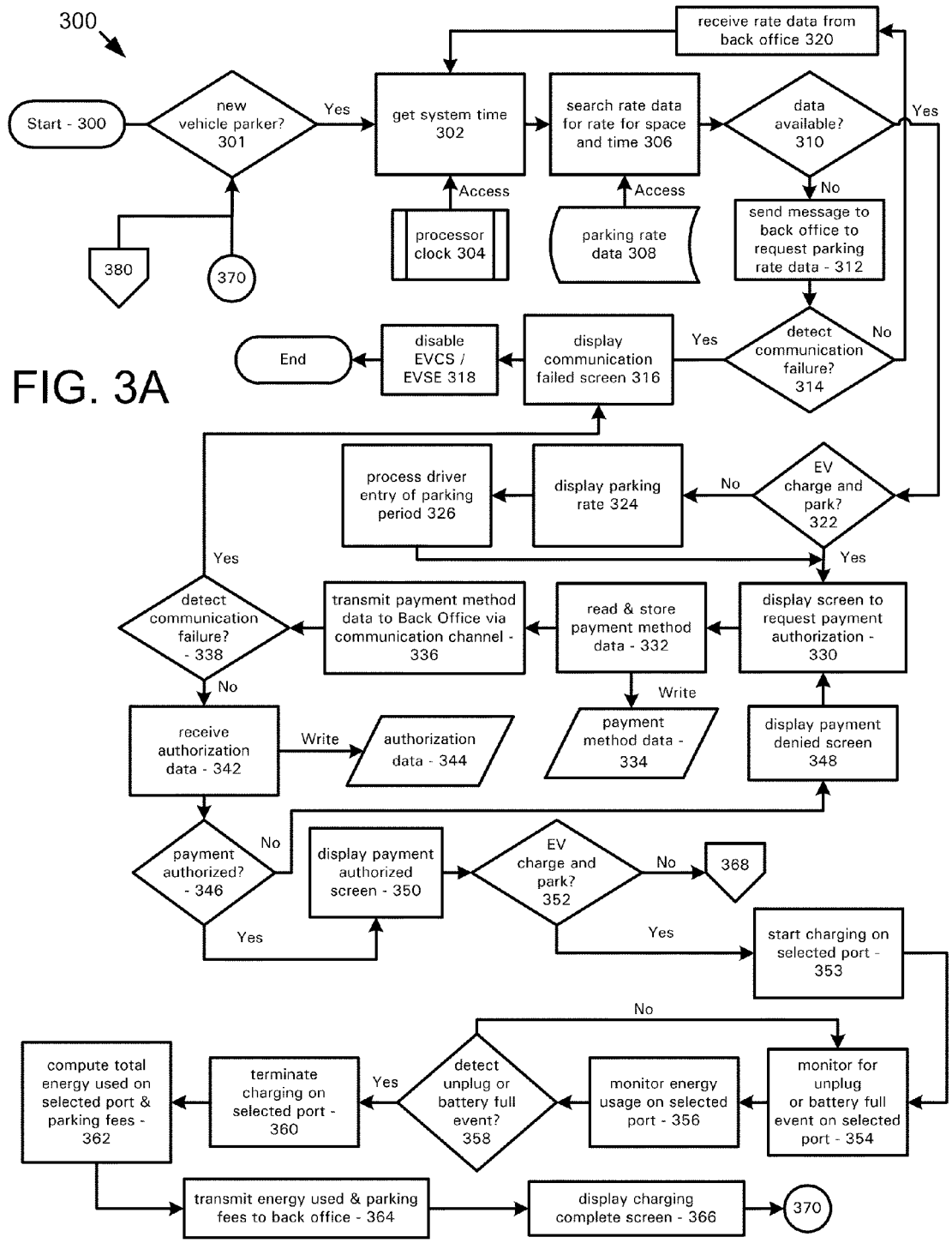
FIGS. 3A and 3B are flowcharts of an exemplary method for operating an EVCS/EVSE according to an embodiment of the disclosed technology.
Figure 3B:
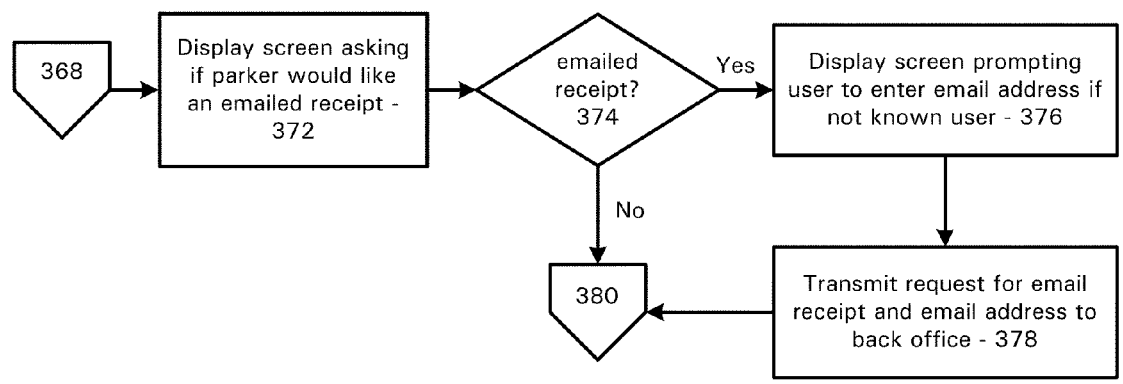

FIGS. 3A-3B is a flow chart 300 showing an exemplary process for operating an EVCS/EVSE according to the disclosed technology. As noted above, the functionality shown in FIGS. 3A-3B can be implemented by computing hardware executing computer-executable instructions. The various procedures shown in FIG. 3 should not be construed as limiting, as any one or more of the procedures can be performed alone or in various other combinations and subcombinations in accordance with the disclosed technology.

Figure 6:
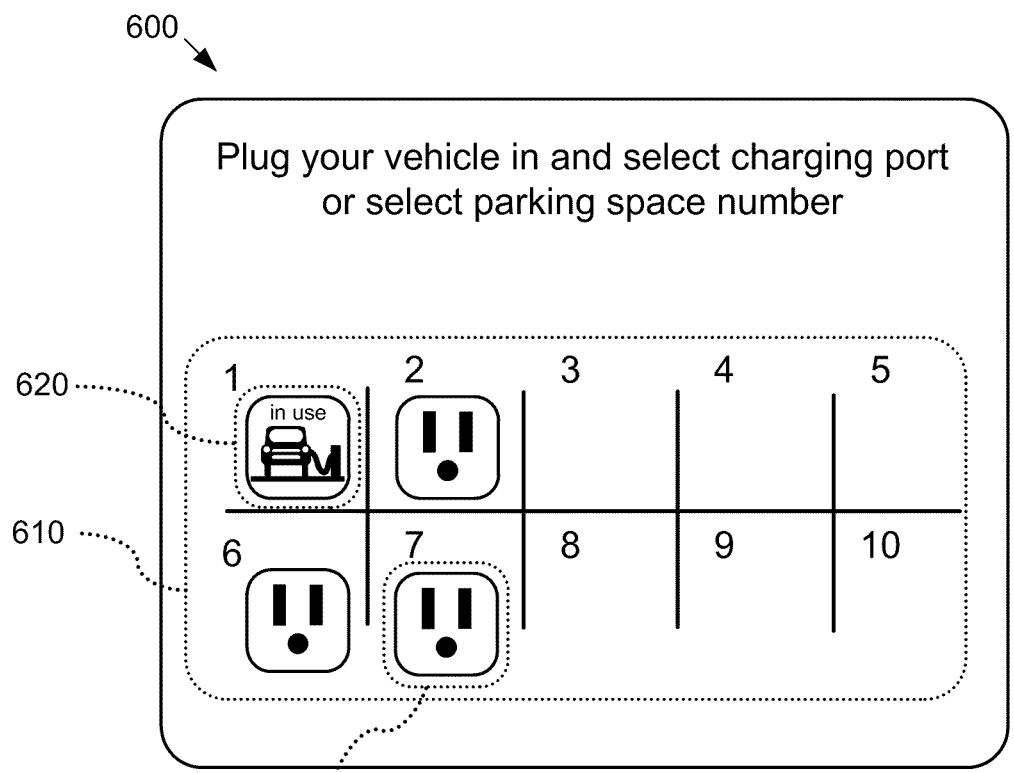
FIG. 6 illustrates an exemplary welcome screen that can be displayed on the EVCS/EVSE
Figure 10:
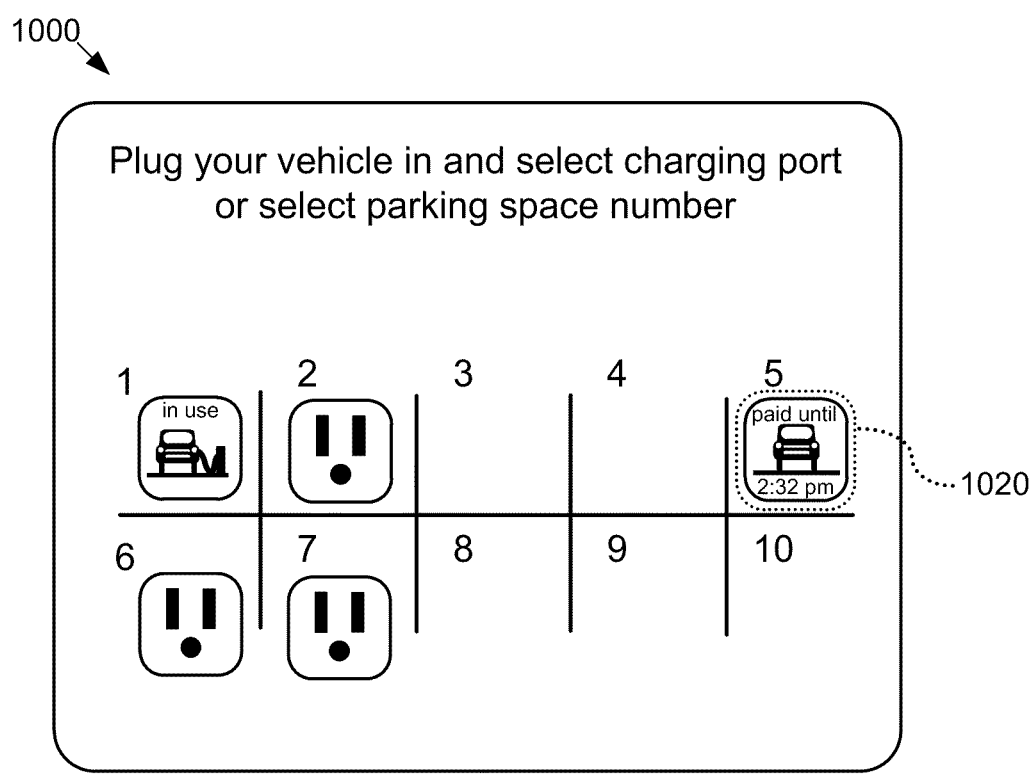
FIG. 10 illustrates an exemplary welcome screen that can be displayed on the EVCS/EVSE when one electric vehicle is already connected and charging in parking space 1 and one non-electric vehicle is paid for parking in space 5.
Figure 11:
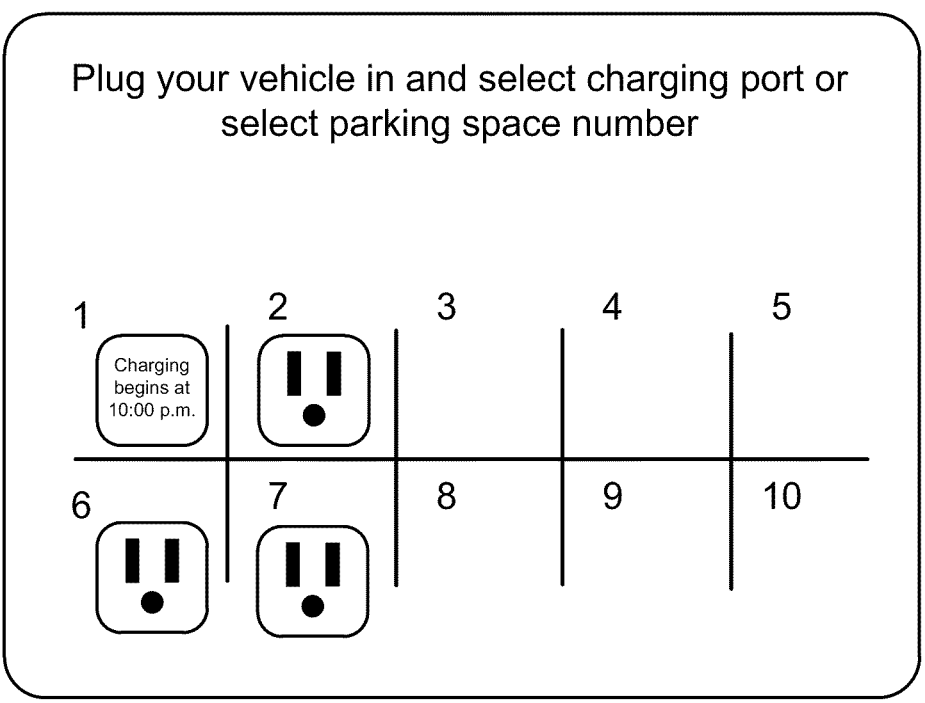
FIG. 11 illustrates an exemplary welcome screen that can be displayed on the EVCS/EVSE which indicates that charging on one of the charging ports will begin at a later time.
Figure 12:
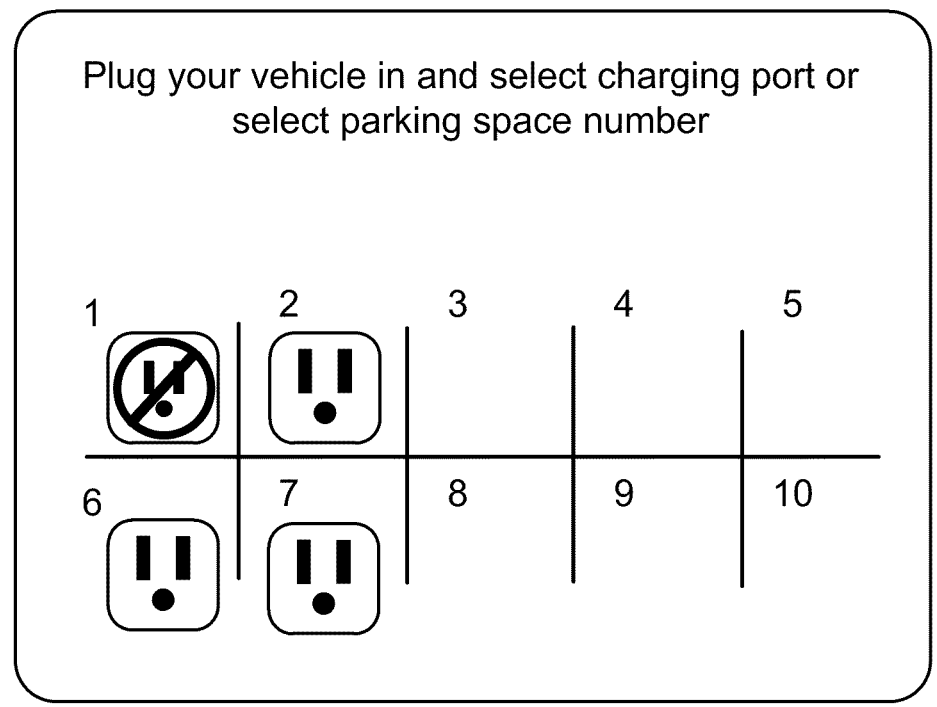
FIG. 12 illustrates an exemplary welcome screen that can be displayed on the EVCS/EVSE which indicates that one of the charging ports is unavailable.

In particular embodiments, and after startup, the EVCS/EVSE 240 will display a welcome screen (process block 301). An exemplary welcome screen that can be displayed is screen 600 shown in FIG. 6. The example screen 600 shows a graphical depiction 610 of the available spaces (including an indication of the space numbering) along with icons (such as icon 620) which identify those spaces that have electric vehicle charging capabilities. The icons can also be adapted to show information about the usage status of a particular space (such as icon 622). The example welcome screen 600 thus displays to the driver (e.g., electric vehicle driver 260) which charging ports are currently in use and which ports are available. The welcome screen can also display to the driver (e.g., non-electric vehicle driver 295) which parking spaces have parking fees paid for and for how long. An example of such a screen is shown in FIG. 10. In particular, FIG. 10 shows an example of a welcome screen 1000 in which one electric vehicle is already connected to the EVCS/EVSE at parking space 1 and charging, and one non-electric vehicle is paid for parking in space number 5 until 2:32 pm (as shown by icon 1020). In other embodiments, the screen 1000 which shows the remaining time paid for in parking spaces is available only to authorized parking enforcement personnel (e.g., who authenticate themselves by swiping an identification card at the EVCS/EVSE or input an authorization code). It should be understood that the graphical depictions and icons shown in FIG. 6 and in FIG. 10 are by way of example only, and a variety of other depictions and icons can be used to show information about the available spaces. Further, in certain embodiments, graphical depictions are not used to identify the available spaces to the user. Instead, the user can be prompted to identify a space number in which they wish to pay for parking without a graphical depiction of the available spaces. Furthermore, and as more fully explained below, one or more advertisements can be displayed on the display device of the EVCS/EVSE. For instance, before the welcome screen 1000 of FIG. 10 is displayed, an advertisement can be displayed. Upon detection of user interaction with the EVCS/EVSE, the advertisement can be replaced with the welcome screen 1000. Additionally, the welcome screen 1000 can itself include one or more advertisements.

In particular embodiments, the EVCS/EVSE stores parking rates (parking rate data 308) and uses the data to compute parking usage charges. The parking rate data (parking rate data 308) includes a schedule to allow the parking fees for a given parking space serviced by the EVCS/EVSE to be determined based upon the chronological time of day, day of week, day of month, day of year, or combinations and/or hybrids of these conditions. If a new vehicle parker wishes to use the EVCS/EVSE to pay for parking privileges (as well as an electrical charge to replenish the vehicle's battery if the driver is driving an electric vehicle), the driver uses the EVCS/EVSE display apparatus to select a new session which can include specifying the parking space number in which the vehicle has been parked. For example, the user can select a corresponding space from the graphical depiction of the parking spaces. The user's selection is received and processed (process block 301) based on which parking space the driver identifies from the welcome screen (e.g., data indicating the user's selection can be buffered into memory, loaded, or otherwise prepared for further processing).

Some electric vehicles will be equipped such that the EVCS/EVSE will detect the presence of the vehicle once the vehicle is connected to the EVCS/EVSE for charging, and this vehicle detection can also be used to determine that a new parker is present. Once there is a new parker and the parking space to be used has been identified, the EVCS/EVSE obtains the system date/time (process block 302) from the system clock (e.g., system clock 304) and then searches the parking rate data (e.g., parking rate data 308) to determine the parking rate (e.g., cost per hour of use) corresponding to the current system date/time (process block 306) and entered parking space. If, for some reason, the EVCS/EVSE cannot read the parking rate data (process block 310), it sends a message to the EVCS/EVSE back office server to request that the back office server send the EVCS/EVSE a new set of parking enforcement data (process block 312). If a communications error is detected when attempting this request (process block 314), a message is displayed indicating that there is a communications failure (process block 316) and, because the EVCS/EVSE cannot properly function without communications, the EVCS/EVSE is disabled (process block 318). Once parking rate data is received from the back office server (process block 320), it is stored on the EVCS/EVSE and the process will begin again with the acts of determining the current time (process block 302) and the correct parking rate to use for the selected parking space based on that date/time (process block 306).

Figure 7:
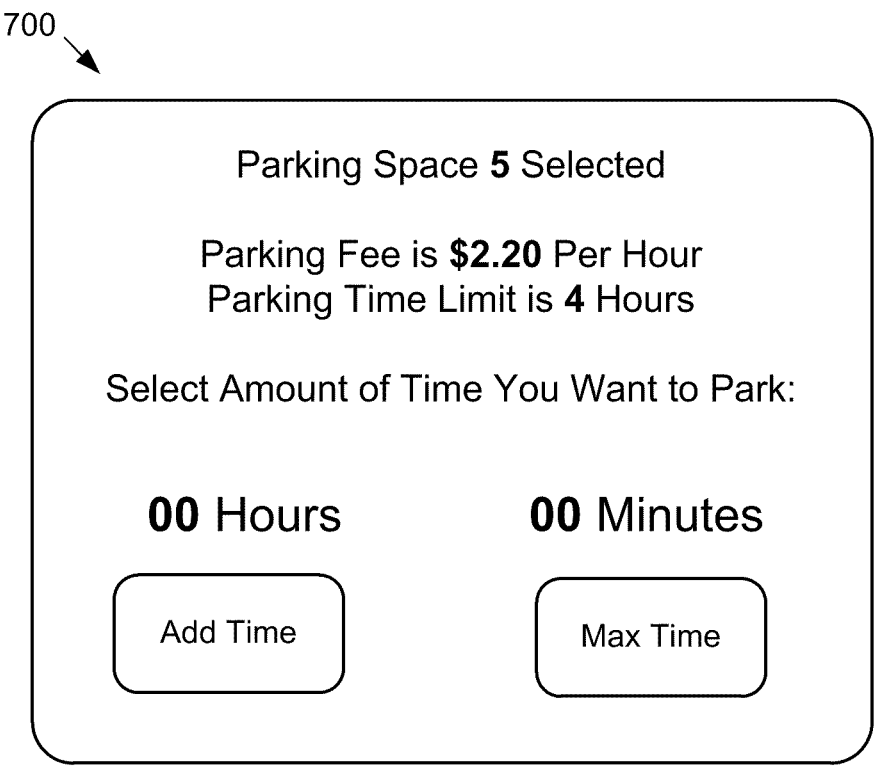
FIG. 7 illustrates an exemplary screen shot that can be displayed to allow the parker to select the amount of time they wish to pay for parking in a selected parking space.

Once the EVCS/EVSE determines the correct parking rate to use, it will determine if this is a park-and-charge session for an electric vehicle or just parking of a non-electric vehicle (process block 322). This determination can be done by determining that a parking space selected by the driver (using the EVCS/EVSE display apparatus) is a space associated with a charging port, or by detecting that an electric vehicle is plugged in to a port associated with the selected space, or by using the EVCS/EVSE display apparatus to ask the parker if it is a parking only session and processing the vehicle parker's response. If the session is for parking only, the EVCS/EVSE will display the correct parking rate (process block 324), prompt the parker to enter the period of time for which they will park their vehicle in the selected space and process the parker's response as the parker interacts with the EVCS/EVSE via the touch screen display and/or the buttons/keypad (process block 326). FIG. 7 shows an example of a screen 700 allowing the parker to enter the time they wish to pay for parking in the selected space. In other embodiments, both park-and-charge sessions and parking only sessions include process blocks 324, 326. For example, a driver of an electric vehicle can select the specific amount of time for which they desire to park and have their vehicle charged. If that time expires, charging can be discontinued at the selected charging port.

Figure 8:
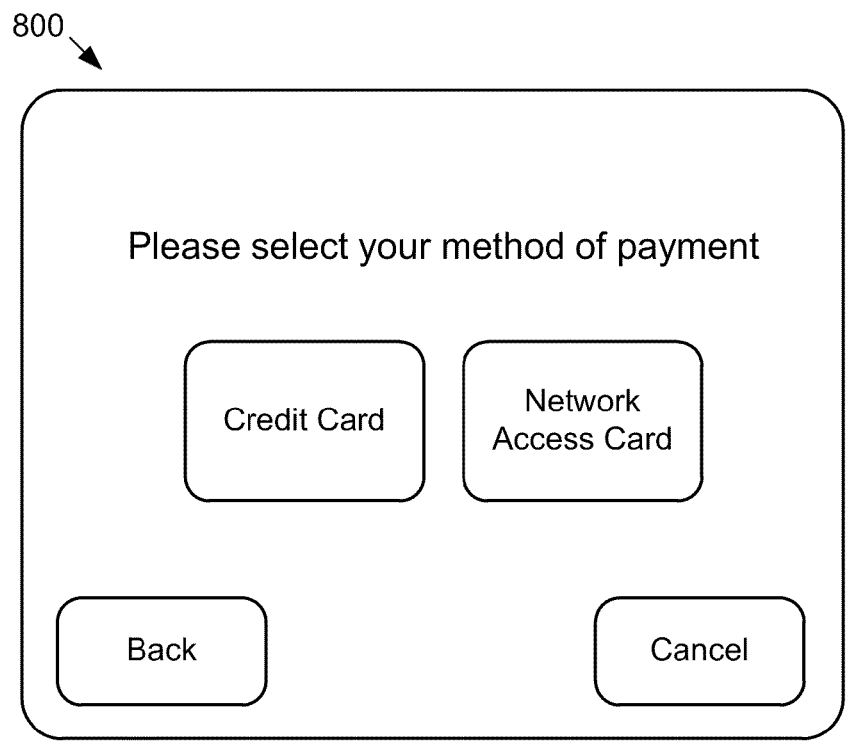
FIG. 8 illustrates an exemplary access type select screen that can be displayed on the EVCS/EVSE.
Figure 9:
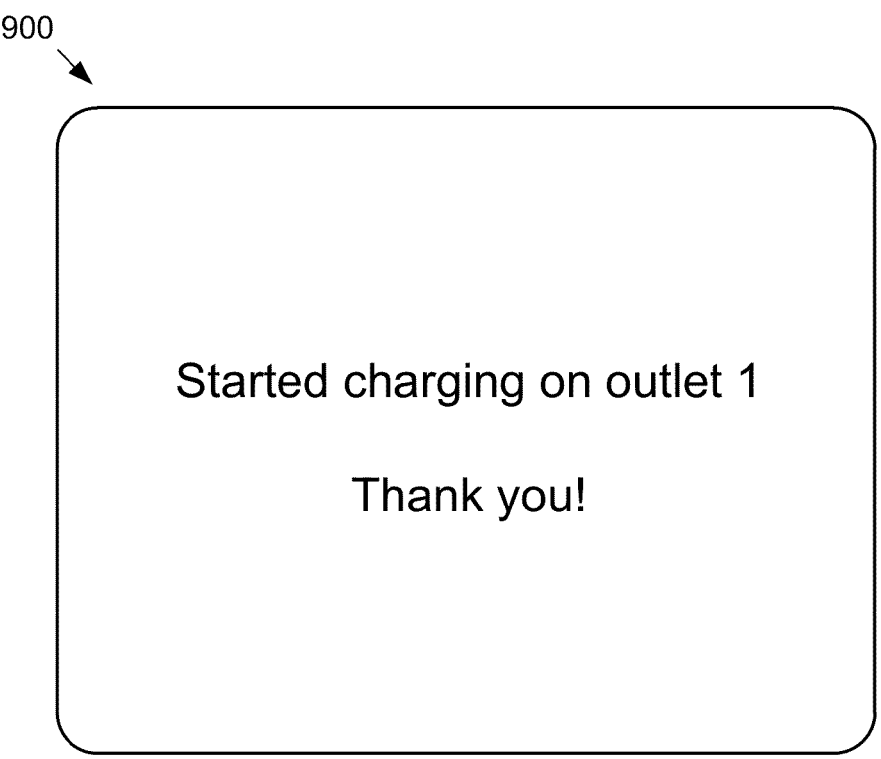
FIG. 9 illustrates an exemplary payment authorized screen that can be displayed on the EVCS/EVSE

Returning to the illustrated embodiment, if the current session is a park-and-charge session for an electric vehicle, or after the non-electric vehicle parker has specified the time they wish to park, the EVCS/EVSE will display a screen to request payment authorization (process block 330). Payment can be authorized by a number of methods such as (but not limited to) using a credit/debit card or other magnetic card (such as a card issued by the operator of the EVCS/EVSE system) that can be swiped on a magnetic card reader or smart card reader integrated into the EVCS/EVSE, or using an RFID card which can be read by an RFID reader integrated into the EVCS/EVSE. FIG. 8 shows an example of a suitable access type selection screen 800 to allow the user to select between two potential payment methods. The EVCS/EVSE will read and store the payment method data to be used to pay for this session (process block 332 and data 334) and transmit the payment method data to the appropriate remote server (which may be the EVCS/EVSE back office server or may be a credit/debit card merchant services server depending upon the payment method used) using the EVCS/EVSE communication channel (process block 336). The payment method data can include user identification data, indicative of an identity of the user (e.g., a credit card number associated with the user or a membership number indicated the user's membership in a network of authorized users). An indication of whether the payment method data is associated with a parking only session or a park-and-charge session can also be transmitted to the back office server. If a communications failure is detected when attempting to transmit the payment method data (process block 338), the EVCS/EVSE will execute the process of displaying the communications failed screen and shutting down (process blocks 316, 318). Otherwise, the EVCS/EVSE will wait to receive authorization data in response to the payment method data that was transmitted and once this authorization data is received, store the payment method data on the EVCS/EVSE (process block 342 and data 344). If the payment method data that was transmitted resulted in an unsuccessful authorization, a payment denied screen is displayed and the EVCS/EVSE will again display the screen to request input of payment authorization data (process blocks 346, 348, 330). If the payment was authorized, the EVCS/EVSE will display a payment authorized screen (process blocks 346, 350). FIG. 9 shows an example of a payment authorized screen 900.

If the current session is an electric vehicle charge and park session and the payment is authorized, charging can then begin at the selected port (process block 353). During charging, the selected port is continuously monitored for an unplug or a battery fully charged event (process blocks 354, 356, 358). In some embodiments, the energy usage at the selected port is also continuously monitored. If an unplug or battery fully charged event is detected, the EVCS/EVSE will terminate the charging on the selected port (process block 360). When an unplug event is detected, the appropriate parking fees based on the amount of time that the vehicle was plugged in for charging and the total energy used is computed (process block 362). The total energy used and parking fees are then transmitted to the back office server (process block 364) so that the charging session can be closed out. Charging statistics and the appropriate parking fees can then be temporarily displayed on the screen (process block 366). In some embodiments, the charging session fees are computed directly by the EVCS/EVSE and transmitted with the parking fees (in which case the total energy used may not be transmitted). Furthermore, a total fee can be computed from the parking fees and the charging fees and transmitted. In still further embodiments, one or more of a charge start time, a charge stop time, or a disconnect time are transmitted (in which case the appropriate fees are computed by the back office server). In embodiments in which EV drivers select a specific parking period (at process block 326), charging can be discontinued after the selected period has expired. Furthermore, in some embodiments, if the vehicle remains connected after this period expires, additional parking fees (e.g., at the same or higher rate) can be charged to the user or a signal can be sent to the back office server or to parking enforcement personnel. In some embodiments, and as more fully explained below, the parking fees and/or any charging fees are provided at a reduced rate (or even for free) because of the revenue generated by advertising displayed on the EVCS/EVSE. The screen will eventually revert to the welcome screen and the EVCS/EVSE will wait for a new parker (process block 370, 301) and the process shown in FIG. 3A can be repeated.

Turning to FIG. 3B, if the payment was authorized and the current session is a parking only session, the EVCS/EVSE can display a screen asking if the parker would like to receive an emailed receipt to document this parking session (process blocks 368, 372). If the parker interacts with the EVCS/EVSE to indicate that they would not like to receive an emailed receipt, the screen will eventually revert to the welcome screen and the EVCS/EVSE will wait for new parker (process blocks 374, 380, 301) and the process shown in FIG. 3 can be repeated. If the parker selected to receive an emailed receipt, and the EVCS/EVSE determines that this is not a customer whose email address is already in the EVCS/EVSE back office customer database, the EVCS/EVSE will display a screen requesting the user to enter an email address to send the receipt to (process block 376), process the entry of that email address, and transmit the receipt to the email address or transmit that email address to the EVCS/EVSE back office server so that a receipt for the appropriate parking fees will be emailed to this parker from the back office server (process block 378). The EVCS/EVSE screen will eventually revert to the welcome screen and the EVCS/EVSE will wait for new parker (process block 380, 301) and the process shown in FIG. 3 can be repeated.

In some embodiments, the EVCS/EVSE includes a printer that prints out a paper payment receipt indicating the time period for which parking was paid by the user. The payment receipt can then be displayed in a window or dashboard of the user's vehicle to show parking enforcement personnel that the user is authorized to park in the space for the selected time period.

Figure 4:
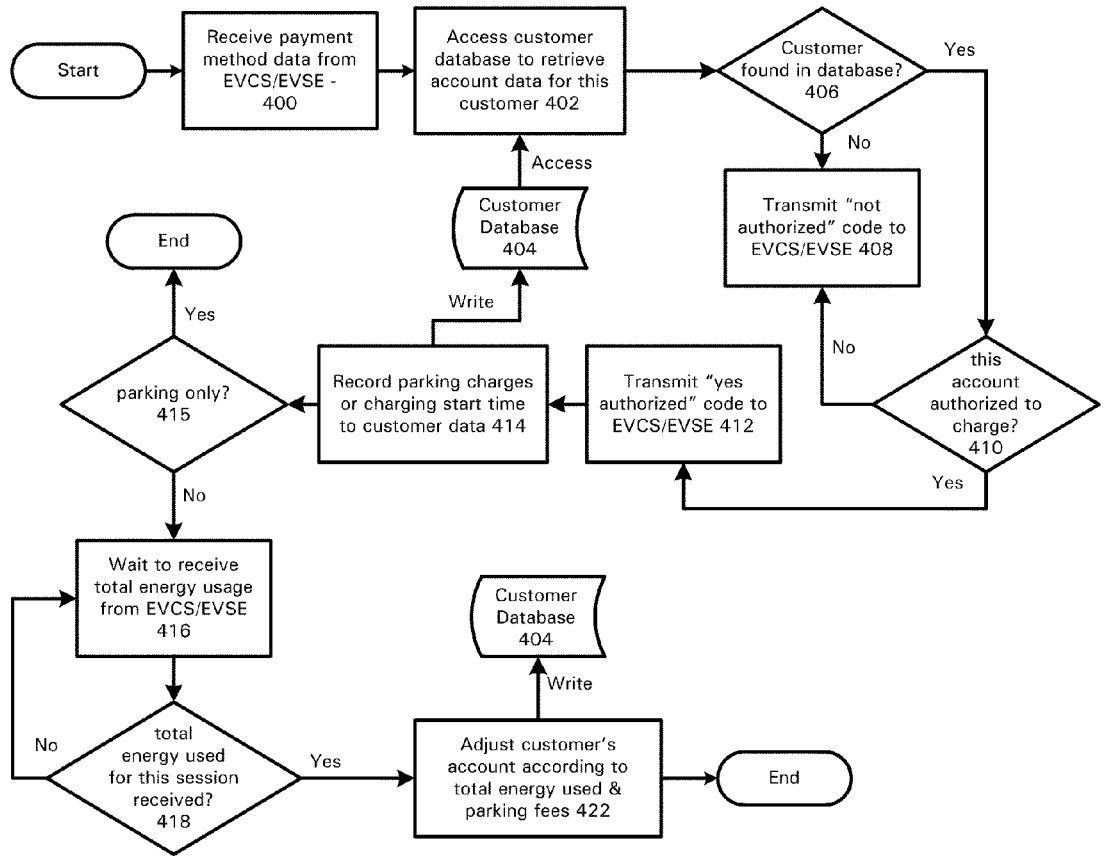
FIG. 4 is a flowchart of an exemplary method for operating a back office system supporting the EVCS/EVSE.

FIG. 4 is a flow chart showing an exemplary process for operating a back office server coupled to an EVCS/EVSE implementing the method shown in FIGS. 3A and 3B or other such method. As noted above, the functionality shown in FIG. 4 can be implemented by computing hardware executing computer-executable instructions. The various procedures shown in FIG. 4 should not be construed as limiting, as any one or more of the procedures can be performed alone or in various other combinations and subcombinations in accordance with the disclosed technology.

Figure 5:
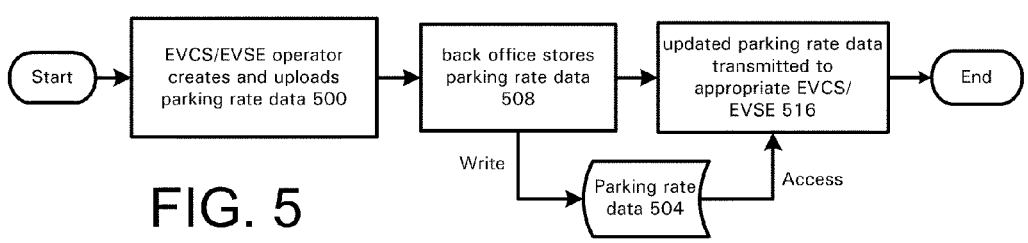
FIG. 5 is a flowchart of an exemplary method for operating a back office system supporting the creating and updating of the parking rate data used by EVCS/EVSE.

FIGS. 4 and 5 are flow charts showing an exemplary process for operating a back office server (e.g., a server located remotely from the EVCS/EVSE, such as a server in a cloud network) coupled to an EVCS/EVSE implementing the method shown in FIG. 3 or other such method. The exemplary process shown in FIG. 4 can be performed, for example, when the payment method selected by the user is to use a card issued by the operator of the EVCS/EVSE (instead of, for instance, a credit card or bank debit card). As noted above, the functionality shown in FIGS. 4 and 5 can be implemented by computing hardware executing computer-executable instructions. The various procedures shown in FIGS. 4 and 5 should not be construed as limiting, as any one or more of the procedures can be performed alone or in various other combinations and subcombinations in accordance with the disclosed technology.

When the back office server receives payment method data from an EVCS/EVSE (process block 400), the back office server will access a customer database 404 (process block 402) and determine if there is a customer or user in the customer database corresponding to the received payment method data (process block 406). An indication of whether the payment method data is associated with a parking only session or a park-and-charge session can also be received from the EVCS/EVSE. If a corresponding customer or user is not found, a code is transmitted to the EVCS/EVSE indicating that the card is not authorized (process block 408). If a corresponding customer is found in the database, the back office server will use this customer's data to determine if the customer is allowed access to this EVCS/EVSE (process block 410). This determination could be based on a financial analysis (e.g., an analysis to determine whether there are sufficient funds in the customer's account), a membership analysis (e.g., an analysis to determine whether the customer is a member of an authorized group of members who can use this station), or some other criteria or combination thereof. If the customer is authorized to use the EVCS/EVSE, a code is sent to the EVCS/EVSE stating that the user is authorized (process block 412). The back office server can also updated the customer database 404 to record the parking fees charged for this session if it is a parking only session (e.g., for a non-electric vehicle) (process block 414). In certain implementations, if the session is a park-and-charge session, a start time of the charging session is recorded in the customer database 404 (process block 414), although in other implementations, the start time is not recorded. If this transaction was for parking only, the transaction is complete (process block 415). Otherwise, the back office server can then wait to receive a message from the EVCS/EVSE indicating completion of the park-and-charge session. This indication can include the total energy usage from the current charging session and the associated parking fees (process blocks 416, 418). Once the total energy usage message is received, the back office server can update the customer's data stored in the customer database 404 accordingly for the energy used and parking fees incurred (process block 422). In other embodiments, the information received from the EVCS/EVSE includes parking fees and charging fees (e.g., the charging fees are computed by the EVCS/EVSE itself). In still other embodiments, the information from the EVCS/EVSE includes a charging stop time and/or a disconnect time, from which the total parking fees and charging fees can be computed.

According to the method shown in FIG. 5, an operator of an EVCS/EVSE that is also used for parking payment functions can use the web site interface driven by the back office software to create and upload parking rate data to the EVCS/EVSE back office server (process block 500). The parking rate data can specify parking rates at different times or days, and can specify one or more EVCS/EVSE in a network of EVCS/EVSE that are to operate using the parking rates. This parking rate data (process block 504) is stored by the back office server and transmitted to the appropriate EVCS/EVSEs (process block 516). At any time, the EVCS/EVSE operator can use the web site interface to the back office server to change the parking rate data for any one or more EVCS/EVSE and to cause the updated parking rate data to be transmitted to the selected one or more EVCS/EVSE.

III. Enhancements of the Disclosed Systems by Providing Advertising Functionality In certain embodiments of the disclosed technology, the parking meter systems described above are additionally configured to display one or more advertisements on the display of the EVCS/EVSE. The advertisements displayed can be displayed when the EVCS/EVSE is not processing a parking fee transaction or can display the advertisement during the process. Furthermore, and as more fully explained below, the advertisements can be targeted advertisements that are selected for the particular user of the EVCS/EVSE. Exemplary processes for providing advertisements to the user are described below with respect to FIGS. 13 and 14. It should be understood that the described embodiments are not be construed as limiting, but can be modified without departing from the principles of the disclosed technology.

Figure 13:
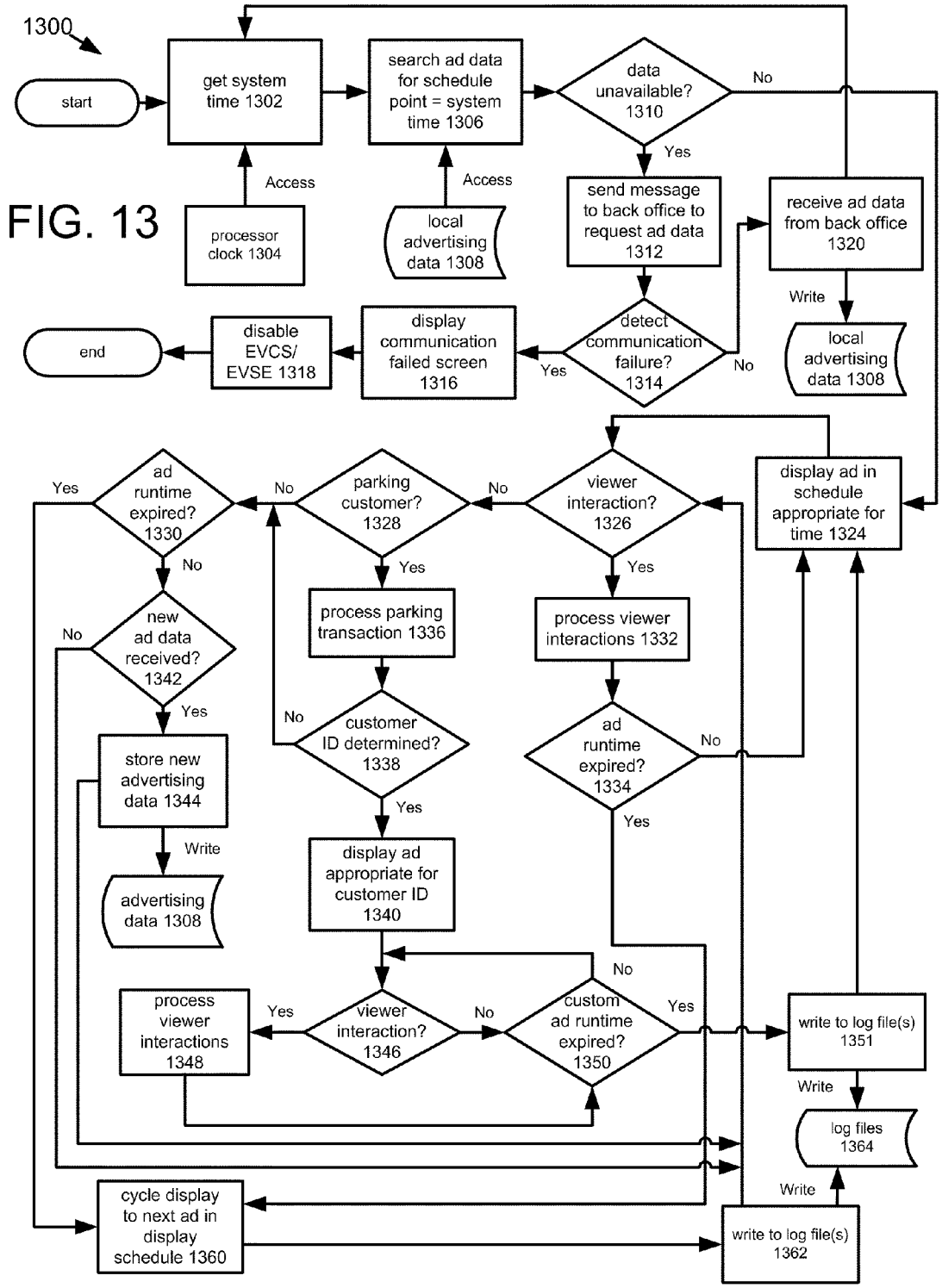
FIG. 13 is a flowchart of an exemplary method for operating an EVCS/EVSE with advertising functionality according to an embodiment of the disclosed technology.

FIG. 13 is a flow chart 1300 showing an exemplary process for operating an EVCS/EVSE and delivering advertising according to the disclosed technology. As noted above, the functionality shown in FIG. 13 can be implemented by computing hardware executing computer-executable instructions. The various procedures shown in FIG. 13 should not be construed as limiting, as any one or more of the procedures can be performed alone or in various other combinations and subcombinations in accordance with the disclosed technology.

In particular embodiments, the EVCS/EVSE is operating in its normal mode and local advertising data (advertising data 1308) is stored and available to display. The advertising data (advertising data 1308) includes a schedule that determines a start time for advertising content to begin displaying (e.g., based on a time of day and calendar day), and a runtime that determines how long to display the advertising content (or the start time for the next advertising content display). The EVCS/EVSE uses the current system time to determine the first piece of advertising content in the schedule to begin displaying. In particular, the EVCS/EVSE obtains the system time (process block 1302) from the system clock (e.g., system clock 1304) and then searches the local advertising data (e.g., advertising data 1308) to determine which advertising data corresponds to the current system time (process block 1306). If for some reason, the EVCS/EVSE cannot read the advertising data (process block 1310), it sends a message to the back office server to request that the back office server send the EVCS/EVSE a new set of advertising data (process block 1312). If a communications error is detected when attempting this request (process block 1314), a message is displayed indicating that there is a communications failure (process block 1316) and, because the EVCS/EVSE cannot properly function without communications, the EVCS/EVSE is disabled (process block 1318). Once advertising data is received from the back office server (process block 1320), it is stored locally on the EVCS/EVSE and the process will begin again with the acts of determining the current time (process block 1302) and which advertising content to display based on that time (process block 1306). In other embodiments, the advertising data (advertising data 1308) includes information indicating a duration that each advertisement is to be displayed but not a specific time for display. In such embodiments, the EVCS/EVSE can then repeatedly cycle through the advertisements, displaying each for its specified duration.

Once the EVCS/EVSE determines the advertising content to display, the EVCS/EVSE will begin displaying this content on the display apparatus (process block 1324). If a viewer of the advertising interacts with the EVCS/EVSE via the touch screen display and/or the buttons/keypad (process block 1326), the EVCS/EVSE will process those interactions as appropriate (process block 1332). For example, the advertising content displayed to the viewer could prompt the viewer to press a button displayed on an area of the display apparatus or use physical buttons/keypad mounted on the EVCS/EVSE enclosure that causes a map to be displayed providing directions to the advertiser's business location, that requests that a text message or email coupon be sent to the viewer, that prints a coupon for the viewer at the EVCS/EVSE (e.g., using a printer at the EVCS/EVSE), or that allows the viewer to enter their personal information in order to receive more information about the advertiser's products or services, etc. The process block 1332 represents the viewer's interactions with the particular advertising content until the viewer has completed all aspects of the interactive process (e.g., the viewer has entered all of the requested information, viewed the map, etc.).

The one or more advertisements displayed at the EVCS/EVSE can have a wide variety of formats and functions. In certain embodiments, the advertisements are for entities other than the EVCS/EVSE operator. For instance, in one advertising example, advertising is displayed to the viewer suggesting that the viewer would enjoy a beverage or food from a nearby merchant or restaurant. The advertising can ask the viewer to send a text message to a certain destination, or press a button on the EVCS/EVSE display apparatus to enter their phone number in order to receive a text of a coupon that the viewer can use to receive a discount on the advertised beverages or snacks. In other embodiments, the EVCS/EVSE can print a coupon at the EVCS/EVSE in response to interaction from the viewer.

In another advertising example, the advertisement can advertise a product and prompt the viewer to press a button on the EVCS/EVSE display apparatus to allow the viewer to enter their e-mail address to receive more information about the product. If the viewer presses the button, for example, a screen with a virtual keyboard can appear on the EVCS/EVSE display apparatus that allows the viewer to enter their email by pressing the keys on the virtual keyboard.

In another example, the identity of the current viewer is identified when the viewer plugs in their electric vehicle or is identified based on the means the EVCS/EVSE uses to determine access for billing purposes (e.g., based on the user's credit card or other card used to activate the EVCS/EVSE). In this example, specific advertising can be displayed to the viewer based on criteria specific to this viewer (e.g., based on demographic information about the user).

In another example, and for an EVCS/EVSE installed at a particular geographic location, advertising content that is pertinent to the geographic location is displayed and/or sent from the back office computer server.

In another example, an EVCS/EVSE is purchased or sponsored by a particular customer who wants advertising or customer loyalty program functions specific to their products or services to be featured on the EVCS/EVSE. In this example, the electric vehicle charging station advertising software running on the back office computer server can deliver the purchaser's or sponsor's specific content to the EVCS/EVSE. The EVCS/EVSE purchaser or sponsor can also develop content specific to certain geographic locations, specific store locations, or specific customer types. Further, the EVCS/EVSE purchaser or sponsor can develop time-sensitive promotions and use the electric vehicle charging station advertising software running on the back office computer server to develop and deploy this content to the EVCS/EVSE.

The information displayed at the EVCS/EVSE is not limited to advertising, however, and can be adapted for other purposes. For instance, in one example, one or more EVCSs/EVSEs are purchased by a vehicle fleet operator for use in charging the fleet's electric vehicles. The back office software application can provide the fleet operator with an interface that will allow them to develop and deploy content specifically to their EVCS/EVSE. This content could be maintenance or other notices that are specific to a specific vehicle or group of vehicles in the fleet, or to a specific driver or group of drivers using the vehicles in the fleet.

In another example, an interface is provided from the back office computer to law enforcement, national security, or other public-safety organizations so that these organizations can upload or develop content such as Amber Alerts and direct the deployment of this content to EVCSs/EVSEs within a certain geographic area, set a time of display for this content to display, etc. Once the law enforcement or public-safety content has been developed, the electric vehicle charging station advertising system can begin to display the time sensitive content as soon as it is received at the EVCS/EVSE, enabling public safety organizations to have a new and innovative method of quickly disseminating information on public, highly visible displays.

Returning to FIG. 13, the EVCS/EVSE will also react to any customers who wish to use the EVCS/EVSE to pay for parking at a selected parking space using either a park-and-charge session or a parking only session (process block 1328). When the EVCS/EVSE detects that a customer wishes to pay for parking and potentially charge their vehicle (process block 1328), the EVCS/EVSE will facilitate the parking payment transaction (process block 1336). For example, the example method illustrated in FIGS. 3A-3B can be performed at process block 1336. As more fully explained above with respect to FIGS. 3A-3B, this process typically comprises transmitting user information (e.g., data indicative of the identity of the user) to the back office server. The user information can be obtained, for instance, from the user's credit card or network access card swiped at the EVCS/EVSE, from an RF identification carried by the user or associated with the user's vehicle, or obtained from data received from the user's vehicle when the user connects their electric vehicle to one of the charging ports of the EVCS/EVSE. The back office server can then determine whether a user is authorized by accessing user data using the user information received. If the user is recognized as an authorized user, a code can be transmitted from the back office to the EVSE/EVSE authorizing use of the EVCS/EVSE.

In certain embodiments, if the process of authorizing the user results in the positive identification of the customer so that the customer's name, gender and/or other personal traits can be determined (process block 1338), the EVCS/EVSE can (in addition to facilitating the parking payment transaction and the charging session transaction) switch the advertising content displayed to advertising content that is appropriate for this particular customer (process block 1340). For example, the EVCS/EVSE can transmit user information (e.g., data indicative of the identity of a user) to the back office server. Based on the user information provided, user data can be accessed that includes demographic information about the user. The demographic information can include, for example, one or more of the user's interests, consumer preferences, consumer history, usage history, age, gender, household income level, employer, or home address. One or more targeted advertisements can then be selected based at least in part on this demographic information about the user. For example, the back office server can select the targeted advertisements based on advertising data associated with each advertisement that indicates the demographic for which the advertisement is intended. Information about the identity of the selected one or more advertisements can then be transmitted to the EVCS/EVSE, which can then load and display the selected advertisements from the advertisements stored locally at the EVCS/EVSE. In other embodiments, the content of the selected one or more advertisements is transmitted to the EVCS/EVSE after selection. The targeted advertisements can be displayed as a separate screen before the parking payment transaction is complete or as part of one of the screens used to process the parking payment transaction.

In some embodiments, at least some of the user data is stored locally at the EVCS/EVSE. Storing the user data locally reduces the number of communications that need to be made to the back office server and increases the speed with which transactions with the user can be performed. In particular embodiments, the locally stored user data is only a portion of the user data for the entire system. This partial database can be created based on a number of criteria. For example, the user data stored in the partial database can be for users with a home address within a certain radius of the EVCS/EVSE, for users who have used the EVCS/EVSE before (e.g., within the last x days), or a combination of such criteria. During operation, when the user of the EVCS/EVSE swipes their card (or otherwise provide user information to the EVCS/EVSE), software executing at the EVCS/EVSE can first evaluate the locally stored user data to determine whether the user is an authorized user. If the user is identified using the locally stored user data, demographic data about the user can be retrieved and one or more targeted advertisements can be selected and displayed to the user. If the user is not identified using the locally stored user data, then the EVCS/EVSE can transmit the user information to the back office server in order to retrieve an authorization code and demographic information (or selected advertising data) for the user.

Furthermore, in certain embodiments, the advertising data used to help select the one or more advertisements can also be stored locally at the EVCS/EVSE. Storing the advertisement data, including the demographic data for the advertisements, at the EVCS/EVSE can help reduce the bandwidth and communication time demands on the EVCS/EVSE system.

Returning to FIG. 13, if the customer interacts with the displayed advertising content (process block 1346), these interactions will be processed by the EVCS/EVSE (process block 1348). The content specific to this customer will continue to display until its runtime expires (process block 1350) if the customer does not interact with it.

Once this custom customer content's runtime has expired, the EVCS/EVSE software will revert to the regular scheduled advertising (process block 1324).

Once the runtime for the regularly scheduled advertising content has expired (process block 1330), the EVCS/EVSE will display the next scheduled advertising content (process block 1360) for the runtime that is specified for this content in the advertising data. If at any point, the EVCS/EVSE receives new advertising data from the back office server, the EVCS/EVSE will overwrite the current advertising data with the newly received data (process blocks 1342, 1344).

One or more log files (log files 1364) that record data about the advertising displayed can be created as or shortly before or after advertising content is displayed on the EVCS/EVSE. For example, as illustrated in FIG. 13, when the EVCS/EVSE displays the next scheduled advertisement after expiration of the previous ad (process block 1360), the one or more log files (log files 1364) can be updated (process block 1362) to include information about the previously displayed advertisement. Similarly, when a custom advertisement displayed to the customer expires, the one or more log files (log files 1364) can be updated (process block 1351) to include information about the previously displayed custom advertisement. The information stored in the log files (log files 1364) can include a variety of information, including, for example, one or more of data concerning the identity of the advertisement displayed, the time at which the advertisement was displayed, the duration of the display of the advertisement, any user interaction that occurred as a result of the advertisement, or an update of a counter indicating the number of times the advertisement was displayed. Periodically, the one or more log files 1364 can be transmitted to the back office server for longer term storage (e.g., once a day, or other desirable time period). The log files transmitted to the back office server can then be used to collect and store data concerning the display of the advertisements across two or more of the EVCS/EVSEs. The data can be used to generate reports for advertising customers that indicate that their ad content was actually displayed, including detailed information about when and where.

Figure 15:
FIG. 15 illustrates an exemplary EVCS/EVSE screen showing a first possible advertisement placement.
Figure 16:
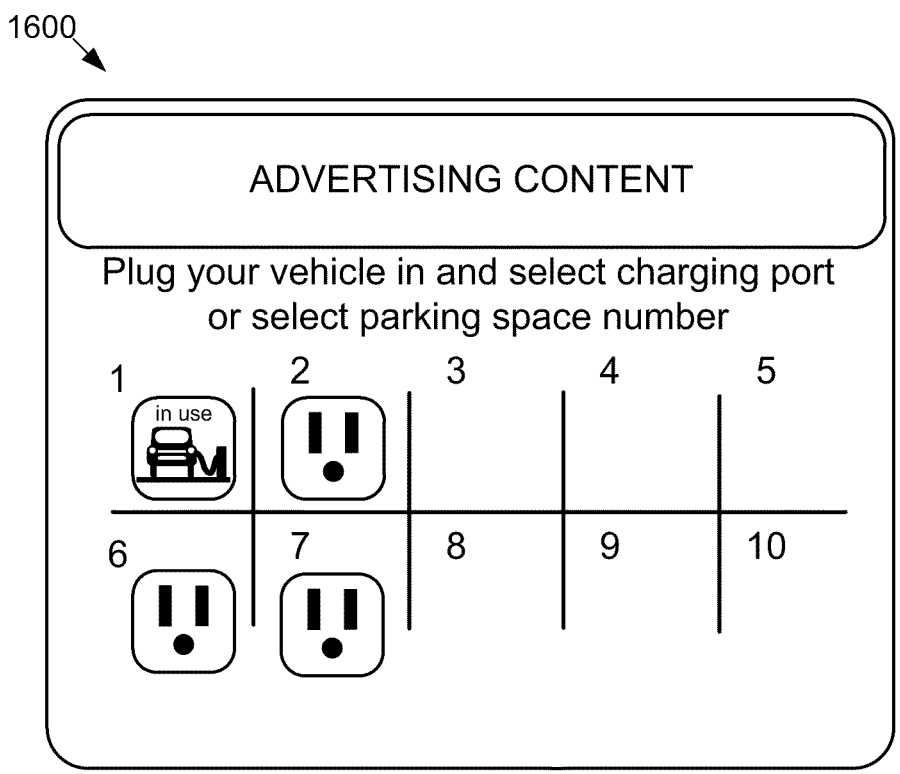
FIG. 16 illustrates an exemplary EVCS/EVSE screen showing a second possible advertisement placement.
Figure 17:
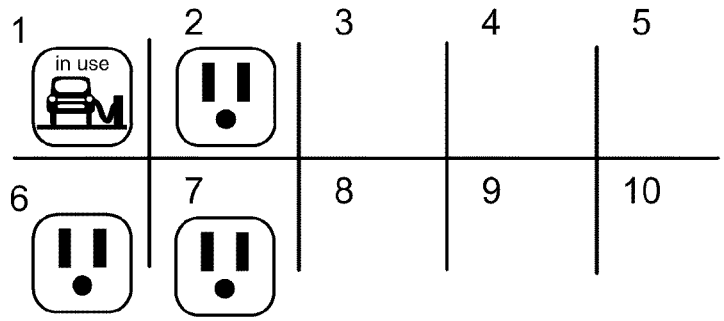
FIG. 17 illustrates an exemplary EVCS/EVSE screen showing a third possible advertisement placement.
Figure 18:
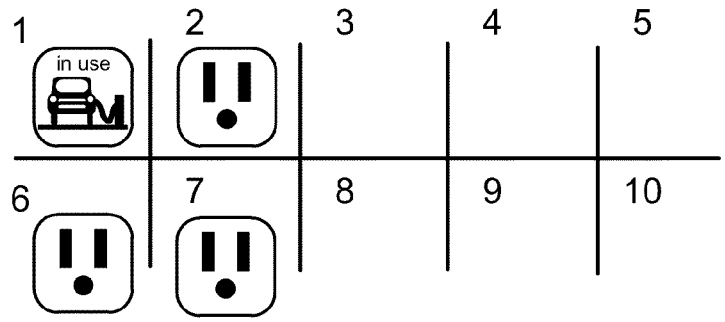
FIG. 18 illustrates an exemplary EVCS/EVSE screen showing a fourth possible advertisement placement.

FIGS. 15-18 show exemplary screen shots of a display on an EVCS/EVSE. The screen shots of FIGS. 15-18 show that advertising content can be included at various locations on the display apparatus but should not be considered as limiting because the advertising can be located elsewhere on the display (e.g., around the perimeter of the display, in the corners of the displays, and other such locations). FIG. 15 shows that when the EVCS/EVSE is not being used to charge electric vehicles, most of the available display area on the EVCS/EVSE display screen can be used to display advertising content with a button for an electric vehicle driver to press to begin using the EVCS/EVSE to charge their vehicle. The advertising shown in FIG. 15 can be displayed at the EVCS/EVSE as the EVCS/EVSE waits for user interaction (e.g., at process block 1326). As shown in screen shot 1500, the display can include an interactive region that a user can press on the touch screen in order to start parking payment operations at the EVCS/EVSE. An exemplary parking payment procedure that can be implemented at the EVCS/EVSE is shown in flow chart 300 of FIGS. 3A-3B. FIGS. 16-18 show potential locations for the advertising content on the EVCS/EVSE display screen while the EVCS/EVSE is being used to pay for parking. More specifically, FIG. 16 shows an exemplary screen shot 1600 of an EVCS/EVSE display in which advertising is displayed in a top region of the display (e.g., in the top half of the display) as the display provides instructions or other information about using the EVCS/EVSE to pay for parking. FIG. 17 shows an exemplary screen shot 1700 of an EVCS/EVSE display in which advertising is displayed in a bottom region of the display (e.g., in the bottom half of the display) as the display provides instructions or other information about using the EVCS/EVSE to pay for parking. FIG. 18 shows an exemplary screen shot 1800 of an EVCS/EVSE display in which advertising is displayed in a central region of the display (e.g., between information on the top and bottom of the display) as the display provides instructions or other information about using the EVCS/EVSE to pay for parking.

Figure 20:
FIG. 20 illustrates an exemplary EVCS/EVSE screen showing an example advertisement.

The manner and style in which advertising can be displayed can vary widely from implementation to implementation. FIGS. 20 shows a further example of how advertising can be displayed on the display screen of the EVCS/EVSE. For instance, FIG. 20 shows a screen with advertising content in which the user is asked to identify a payment method.

Figure 14:
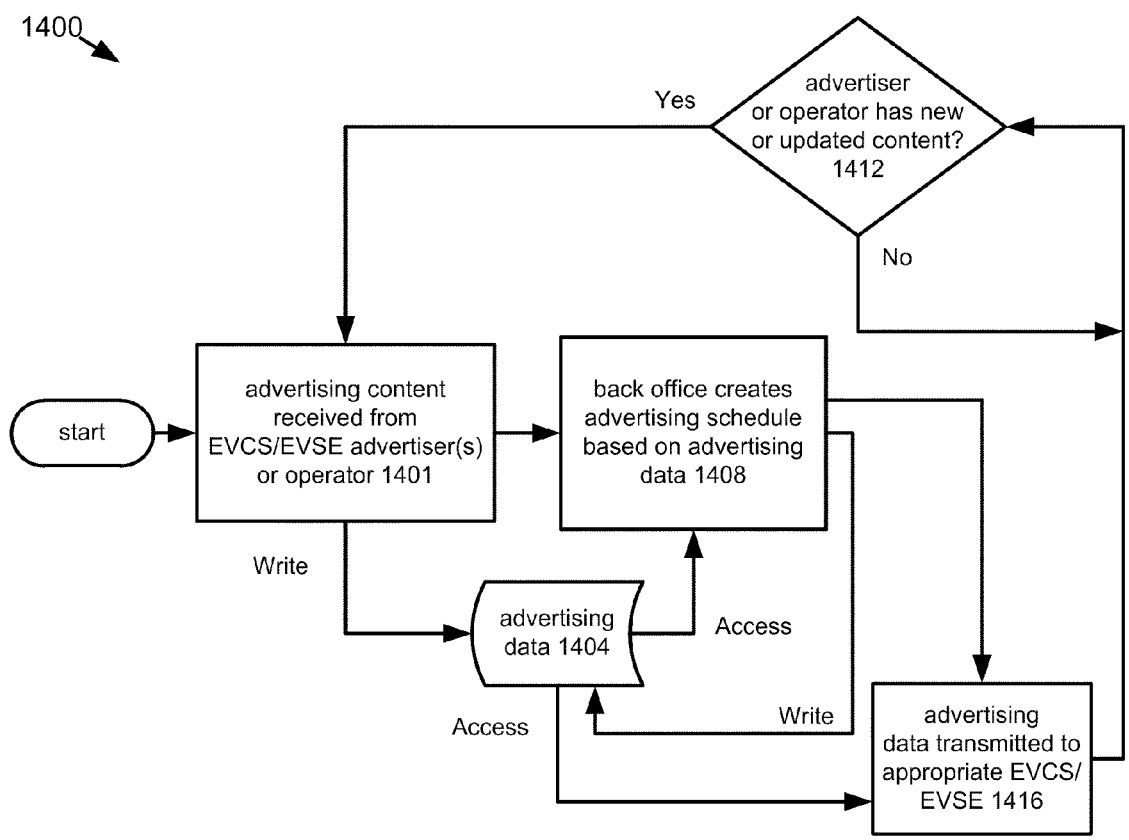
FIG. 14 is a flowchart of an exemplary method for operating a back office system supporting the EVCS/EVSE of FIG. 13.

FIG. 14 is a flow chart 1400 showing an exemplary process performed by a back office server coupled to an EVCS/EVSE implementing the advertising display method shown in FIG. 13 or other such method. As noted above, the functionality shown in FIG. 14 can be implemented by computing hardware executing computer-executable instructions. The various procedures shown in FIG. 14 should not be construed as limiting, as any one or more of the procedures can be performed alone or in various other combinations and subcombinations in accordance with the disclosed technology.

According to the method shown in FIG. 14, advertising content is received from an advertising customer or the EVCS/EVSE operator (process block 1401). For example, in certain embodiments, an advertising customer or the EVCS/EVSE operator can create and upload advertising content (e.g., images, motion pictures, interactive applications, audio, etc.) via a web site or other user interface. In certain embodiments, the advertising content received can include scheduling information or other information about how to display an advertisement. For example, in particular embodiments, the advertising customer or EVCS/EVSE operator can select one or more of the following for an advertisement: the geographic location(s) they would like the ad to be shown (e.g., the location of the EVCSs/EVSE in the system in which the advertisement is desired to be displayed), the days and hours of the day they would like the ad to be shown, the duration the ad is to be displayed, or the traits of the viewers that they would like to target with the ad. For instance, in certain embodiments, the advertiser or EVCS/EVSE operator is presented with available times of the day through a list or pull-down menu from which they can select a desired time slot. Times that are unavailable can be shown as unavailable, or not displayed at all. Other methods of informing the advertiser or EVCS/EVSE operator of available and/or unavailable times can also be used. The time periods available can vary from implementation to implementation and can include a wide variety of time periods (e.g., 5 minutes, 10 minutes, 30 minutes, 1 hour, or 2 hour periods). In some embodiments, the advertiser or EVCS/EVSE operator selects a duration for which an advertisement is to be displayed during a fixed period of time (e.g., 1 day). The advertisement can then be placed in a list of advertisements, which is cycled through during EVCS/EVSE operation. The duration of display can be any suitable duration (e.g., 5 minutes, 10 minutes, 30 minutes, 1 hour, or 2 hours). In such embodiments, the time when the user is interacting with the EVCS/EVSE may not count as part of the advertisement duration so the actual time of display may vary from day to day.

The advertising content received is saved as advertiser data (advertising data 1404). The back office server builds the advertising schedule for each individual EVCS/EVSE based on the complete data set of advertising data (process block 1408). For example, the advertising schedule for an individual EVCS/EVSE can be created using advertising content selected for display in the geographic region of the EVCS/EVSE and using the times or display durations selected by the advertisers or the EVCS/EVSE operator. Once the back office software has created the advertising schedule for a EVCS/EVSE, it will transmit to the EVCS/EVSE that station's advertising data (process block 1416). The advertising data can be transmitted, for example, as computer-readable data via the communication link. For example, the advertising data can be compressed using a Java gzip technique or any other suitable image or video compression technique or standard (e.g., JPEG, JPEG XR, h.264, VC-1, or other such techniques or standards). At any time, one or more of the advertisers (or the EVCS/EVSE operator) can update the existing advertising content or add new advertising content (process block 1412). If this is done, the advertising data (advertising data 1404) is updated with the new or modified advertising content (process block 1401).

Embodiments of the disclosed electric vehicle charging system provide a networked outdoor advertising system built around the emerging electric vehicle ("EV") and charging infrastructure industries. Embodiments of the system can be used to provide a publically accessible, networked smart charging system in cities or other communities having a large and established outdoor advertising market. With an installed base in place, embodiments of the disclosed electrical vehicle charging system can offer an iconic, digital advertising platform that stands out in a cluttered outdoor space. The system can be used to engage the driver parking their car at work, school, place of worship, shopping center or other such destination where it is desirable to make contact with a potential consumer.

Embodiments of the disclosed electric vehicle charging system have full-color, touch screens that can be used for display, geo- and demographic-based advertisements, and for providing other value-added messaging capabilities to charging station customers.

By using electric vehicle supply equipment to establish an outdoor digital advertising network and to have parking enforcement functionality, embodiments of the disclosed technology can operate and generate revenue unlike any other electric vehicle supply equipment manufacturer. For example, analysis has shown that significantly more revenue can be generated from selling advertising and from operating parking lots than from purely selling electricity or access to that electricity. Thus, and in contrast to other electric vehicle charging systems, embodiments of the disclosed system can generate revenue entirely or at least partially through advertising and through parking space fees. For example, in certain embodiments of the disclosed systems, the electricity supplied by the system is provided to the electric vehicle user free of charge. Consequently, embodiments of the disclosed technology can be installed, maintained, and operated free of charge to the EV driver. (EV drivers can also be charged a reduced or nominal price for the electricity they use (e.g., less than the market price of electricity).) By contrast, many EVCS/EVSE manufacturers are attempting to design and sell the lowest cost EVCS/EVSE with a business model built around decreasing manufacturing costs and increasing market penetration faster than their competitors to allow them to earn an acceptable rate of return on their manufacturing activities. Such manufacturers will therefore compete with operators of the disclosed technology for installation locations based solely on the equipment and installation costs that they can offer. But the advertising and parking space management capabilities of the disclosed technology allow the EVCSs/EVSEs of embodiments of the disclosed technology to be offered to installers, installation partners, or installation-site owners (e.g., municipalities, utilities, or private entities) at a cost of $0 or at a cost reduced to a small or nominal amount other than $0 but less than the market price for installation. Further, the EVSE installers, installation partners, or installation-site owners can receive a portion (e.g., a percentage) of the advertising revenue, providing them with a further incentive to install embodiments of the disclosed technology rather than conventional charging equipment. Revenue sources for embodiments of the disclosed technology alternatively or additionally include one or more of the following: access to the electricity from the charging stations, purchase and installation of the charging stations, or supply of maintenance and other data which can be pulled from the vehicle and end user from charging events.

Using embodiments of the disclosed technology, a variety of customers (or users) can be served. For example, one of the customers is the EV driver using a charging station. Embodiments of the charging station and supporting back office infrastructure described above can offer these customer an open payment system with a variety of options, flexibility, and a quick, safe, easy-of-use charging experience. Other customers include advertising customers. Embodiments of the networked-based system described above (which can be a cloud-based system) allows advertising customers to establish and control their advertising campaigns.

Potential advertisers who will use the digital advertising network created by embodiments of the disclosed technology include those advertisers seeking to gain visibility, awareness and affinity primarily with the desirable EV driver demographic and secondarily with consumers who travel past implementations of the disclosed charging stations at, or near, the point of sale in urban and commercial settings.

In certain implementations of the disclosed electric vehicle charging system, EV drivers can register to become a member of the network of charging stations (e.g., using a web site, written registration form, or other such registration means). The EV driver can provide personal information as part of the registration process and, as members of the network, receive free or a reduced cost for charging at all (or a selected subset of) charging stations in the system. The system can then be used to offer advertisers a digital advertising network to deliver targeted advertising to registered members (e.g., using the personal information provided during the registration process) in addition to geographically targeted advertising to display to consumers who travel past charging stations in the system. EV drivers who are not currently registered with the network can pay for access to stations using a suitable payment method (e.g., a credit card or credit account). Such non-member drivers can be offered the opportunity to join as a network member when they access a station with a credit card. In certain embodiments, non-EV drivers can also become a network member and receive discounted parking rates, pay for parking over an extended period (e.g., a monthly parking permit), and/or maintain a balance from which parking fees are deducted.

As more fully explained above, embodiments of the disclosed electric vehicle charging system include one or more charging stations; a back office system (e.g., a cloud-based back office system) supporting charging station usage payments and parking fee payments (e.g., for both electrical-vehicle-charging customers and non-electrical-vehicle customers); a back office system support advertising selection and delivery; and the wireless communications network linking the charging stations to the back-office system. Certain implementations of the disclosed technology use a peer-to-peer messaging system that ensures data is transmitted securely, efficiently and reliably between charging stations and various end points (e.g., the back office or the vehicle manufacturer(s)). For instance, in particular implementations, the OpMessaging peer-to-peer messaging system available from Optimization Technologies is used. The messaging system can be used to manage the advertising network on a real-time basis, either nationally or location specific. This system is scalable as communications increase, as the number of vehicles increase, and as the number of charging points increase. Further, the messages transmitted in the network can include attributes indicating a priority of the message and/or an expiration time for the message, as more fully described in U.S. Nonprovisional application Ser. No. 13/033,179, filed on Feb. 23, 2011, and entitled "ELECTRIC VEHICLE CHARGING STATIONS WITH TOUCH SCREEN USER INTERFACE," which is hereby incorporated herein by reference.

In particular embodiments of the disclosed electric vehicle charging system, any one or more of the following types of advertising and promotions can be provided to the display of a charging station: (1) static display ads (these are static graphical images that are displayed on the display device of the charging station (e.g., on an LCD)); (2) animated ads (these are animated or video advertisements that are more like commercials that are displayed on the display device of the charging station (e.g., on an LCD)); or (3) interactive ads (these are either static or animated ads or a hybrid of the two that also incorporate an interaction with the user).

Embodiments of the networked electric vehicle charging system can be linked through a centralized computer system to change advertisements on any number of charging station displays in the system. This flexibility allows advertisers to change messaging over the course of a day, or campaign, and the ability to focus on narrow target demographics at different times of the day. Embodiments of the electric vehicle charging system can be used to provide targeted advertising messages based on geographic location and the end user's recorded preferences. For example, in certain embodiments, the back-end server maintains a database of charging and/or parking activity for EV or non-EV drivers. This data can be used to determine driving patterns or potentially routines of the members of the system. For example, parking patterns can be determined using this information. Additionally, the information can be used to determine where the member works. Additionally, the database can store data about a member's personal or consumer preferences or characteristics (provided when the member signed up, or periodically updated by the member). This data can be used to deliver targeted advertising to members when they are using a charging station in the system. For example, once an EV driver or non-EV driver has swiped their network access card at the charging station for parking payment purposes, the identity of the member can be determined and their personal data accessed. The back-end server can then transmit a targeted advertisement or message to the member at the station. The member data stored by the back-end server can also be used to deliver targeted advertising to members when they are using any access point to the network (e.g., the web site or smart phone application for the system).

IV. Further Embodiments

Having described and illustrated the principles of the disclosed technology in the detailed description and accompanying drawings, it will be recognized that the various embodiments can be modified in arrangement and detail without departing from such principles. Furthermore, any features or aspects of the disclosed embodiments can be used in various combinations and subcombinations with one another. For example, the following paragraphs describe various additional embodiments of the disclosed technology.

One embodiment disclosed herein is a method comprising displaying a parking rate to a user of an electric vehicle charging station ("EVCS") or electric vehicle supply equipment ("EVSE"); receiving parking fee payment information from the user; and processing the parking fee payment information. The parking rate can be based at least in part on one or more of the following criteria: a location of a parking area served by the EVCS/EVSE, a chronological factor, meteorological conditions, or the type of vehicle parking. In some implementations, the method further comprises prompting a user to input information about a parking place to be paid for by the user and an amount of time the user desires to park at the parking place; and receiving input from the user in response to the prompting, the input being received via a touch screen or keypad associated with the EVCS or EVSE. The method can further comprise causing a virtual numerical, alpha, or alpha-numerical keyboard to be displayed to the viewer, the virtual numerical, alpha, or alpha-numerical keyboard being configured to allow the viewer to input data in response to requests to input data. In certain implementations, the method further comprises controlling a charging or discharging operation for one or more vehicles coupled to the EVCS or EVSE.

Another embodiment disclosed herein is an electric vehicle charging station ("EVCS") or electric vehicle supply equipment ("EVSE") comprising a display device; a computer processor; and one or more non-transitory computer-readable media storing computer-executable instructions which when executed by the computer processor cause the display device to display a user interface configured to allow a user to selectively charge an electric vehicle and pay for a parking space occupied by the electrical vehicle. The display device can comprise a touch screen interface. In certain implementations, the one or more non-transitory computer-readable media further store computer-executable instructions which when executed by the computer processor cause the EVCS or EVSE to detect the presence of the electric vehicle when the electric vehicle is coupled to an outlet of the EVCS or EVSE. The EVCS or EVSE can further comprise a printer configured to print a receipt indicating payment for the parking space. In some implementations, the user is a first user, and the user interface is further configured to allow a second user to pay for a parking space occupied by a non-electric vehicle.

Another embodiment disclosed herein is a method comprising, using a computer processor, transmitting parking rate data to an EVCS or EVSE, the EVCS or EVSE being configured to display parking rates for parking spaces served by the EVCS or EVSE based on the parking rate data. The method can also include receiving parking management data from the EVCS or EVSE, the parking management data comprising one or more: data indicative of an identity of a parking space served by the EVCS or EVSE, data indicative of a payment status for the parking space, data indicative of the presence and/or type of electric vehicle at the parking space, or data indicative of the identity of a user at the EVCS or EVSE; and storing the parking management data on one or more non-transitory computer-readable media. In some implementations, the act of storing comprises storing the parking management data with parking management data from at least one other EVCS or EVSE. The method can also comprise transmitting at least a portion of the parking management data to a remote computer.

Another embodiment disclosed comprises one or more non-transitory computer-readable media storing computer-executable instructions which when executed by a computer cause the computer to perform a method. In this embodiment, the method comprises using a computer processor, transmitting parking rate data to an EVCS or EVSE, the EVCS or EVSE being configured to display parking rates for parking spaces served by the EVCS or EVSE based on the parking rate data. The method can further comprise receiving parking management data from the EVCS or EVSE, the parking management data comprising one or more of: data indicative of an identity of a parking space served by the EVCS or EVSE, data indicative of a payment status for the parking space, data indicative of the presence and/or type of electric vehicle at the parking space, or data indicative of the identity of a user at the EVCS or EVSE; and storing the parking management data on one or more non-transitory computer-readable media. In some implementations, the act of storing comprises storing the parking management data with parking management data from at least one other EVCS or EVSE. The method can further comprise transmitting at least a portion of the parking management data to a remote computer.

Another embodiment disclosed herein is a computer comprising a computer processor; and one or more non-transitory computer-readable media storing computer-executable instructions which when executed by the computer processor cause the computer to perform a method. In this embodiment, the method comprises transmitting parking rate data to an EVCS or EVSE, the EVCS or EVSE being configured to display parking rates for parking spaces served by the EVCS or EVSE based on the parking rate data. The method can further comprise receiving parking management data from the EVCS or EVSE, the parking management data comprising one or more of: data indicative of an identity of a parking space served by the EVCS or EVSE, data indicative of a payment status for the parking space, data indicative of the presence and/or type of electric vehicle at the parking space, or data indicative of the identity of a user at the EVCS or EVSE. The method can also comprise storing the parking management data with parking management data from at least one other EVCS or EVSE. In some implementations, the method further comprises transmitting at least a portion of the parking management data to a remote computer.

Another disclosed embodiment comprises providing a web site for parking enforcement personnel, the web site allowing the parking enforcement personnel to control one or more parking rates displayed on one or more electric vehicle charging stations and further allowing the parking enforcement personnel to view parking management data indicative of one or more of an identity of one or more parking spaces served by one or more selected EVCSs or EVSE, a geographic location of the parking spaces, and a payment status of the parking spaces.

Another disclosed embodiment comprises one or more non-transitory computer-readable media storing computer-executable instructions which when executed by a computer cause the computer to perform a method. In this embodiment, the method comprises providing a web site for parking enforcement personnel, the web site allowing the parking enforcement personnel to control one or more parking rates displayed on one or more electric vehicle charging stations and further allowing the parking enforcement personnel to view parking management data indicative of one or more of an identity of one or more parking spaces served by one or more selected EVCSs or EVSE, a geographic location of the parking spaces, and a payment status of the parking spaces.

Another embodiment disclosed herein is a computer comprising a computer processor; and one or more non-transitory computer-readable media storing computer-executable instructions which when executed by the computer processor provide a web site for parking enforcement personnel. In this embodiment, the web site is configured to allow the parking enforcement personnel to control one or more parking rates displayed on one or more electric vehicle charging stations and further allowing the parking enforcement personnel to view parking management data indicative of one or more of an identity of one or more parking spaces served by one or more selected EVCSs or EVSE, a geographic location of the parking spaces, and a payment status of the parking spaces.

Furthermore, it is to be understood that any of the features and embodiments described herein can be used in combination with any of the features and embodiments described in U.S. Nonprovisional application Ser. No. 13/033,179, filed on Feb. 23, 2011, and entitled "ELECTRIC VEHICLE CHARGING STATIONS WITH TOUCH SCREEN USER INTERFACE, " which is a continuation-in-part of U.S. Nonprovisional application Ser. No. 12/954,209, filed on Nov. 24, 2010, and entitled "ELECTRIC VEHICLE CHARGING STATION ADVERTISING SYSTEMS", which claims the benefit of U.S. Provisional Application No. 61/307,318, filed on Feb. 23, 2010, and entitled "ELECTRIC VEHICLE CHARGING STATION WITH TOUCH SCREEN USER INTERFACE"; U.S. Provisional Application No. 61/409, 108, filed on Nov. 1, 2010, and entitled "ELECTRIC VEHICLE CHARGING STATION WITH TOUCH SCREEN USER INTERFACE"; U.S. Provisional Application No. 61/307,377, filed on Feb. 23, 2010, and entitled "ELECTRIC VEHICLE CHARGING STATION ADVERTISING SYSTEM"; U.S. Provisional Application No. 61/353,944, filed on Jun. 11, 2010, and entitled "ELECTRIC VEHICLE CHARGING STATION ADVERTISING SYSTEM"; and U.S. Provisional Application No. 61/317,181, filed on March 24, 2010, and entitled "ELECTRIC VEHICLE CHARGING STATION PARKING METER SYSTEM", all of which are hereby incorporated herein by reference.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims and their equivalents. I therefore claim as my invention all that comes within the scope and spirit of these claims and their equivalents.

What is claimed is:

1. A method of operating an electric vehicle charging station ("EVCS") or electric vehicle supply equipment ("EVSE"), comprising:
with computing hardware at the EVCS or EVSE,
receiving an indication at the EVCS or EVSE of a parking space at which a user of the EVCS or EVSE desires to park;
determining if the parking space indicated by the user is associated with an electric vehicle charging port;
if the parking space indicated by the user is associated with an electric vehicle charging port,
determining whether the user is authorized to use the EVCS or EVSE, and
if the user is authorized to use the EVCS or EVSE, controlling a charging operation that provides an electric charge via the electric vehicle charging port; and
if the parking space indicated by the user is not associated with an electric vehicle charging port,
determining whether the user is authorized to use the parking space not associated with the electric vehicle charging port, and
providing the user with an indication that the user is authorized to use the parking space not associated with the electric vehicle charging port.

2. The method of claim 1, wherein the receiving comprises receiving the indication of the parking space at which the user of the EVCS or EVSE desires to park via a touch screen interface associated with a display device of the EVCS or EVSE.

3. The method of claim 1, wherein the method further comprises displaying graphical depictions of parking spaces managed by the EVCS or EVSE on a display device of the EVCS or EVSE, and wherein the receiving comprises receiving data indicating user interaction with one of the graphical depictions via a touch screen interface associated with the display device.

4. The method of claim 1, wherein the determining whether the user is authorized to use the EVCS or EVSE comprises:
receiving account information from the user;
accessing user data stored locally at the EVCS or EVSE; and
determining that the user is authorized to use the EVCS or EVSE by using the account information to identify the user as an authorized user from the user data.

5. The method of claim 1, wherein the determining whether the user is authorized to use the EVCS or EVSE comprises:
receiving account information from the user;
transmitting at least a portion of the account information to a remote server; and
receiving a response from the remote server.

6. The method of claim 5, wherein the account information is either credit card account information or account information indicating that the user is a member of a network of authorized users.

7. The method of claim 1, wherein the determining whether the user is authorized to use the parking space comprises:
receiving an indication of a period for which the user desires to park;
receiving account information from the user;
accessing user data stored locally at the EVCS or EVSE; and
determining that the user is authorized to use the parking space by using the account information and the indication of the period to identify the user as an authorized user from the user data.

8. The method of claim 1, wherein the determining whether the user is authorized to use the parking space comprises:
receiving an indication of a period for which the user desires to park;
receiving account information from the user;
determining a cost for parking for the desired period using locally stored parking rate information; and
transmitting the cost for parking and at least a portion of the account information to a remote server.

9. The method of claim 8, wherein the account information is either credit card account information or account information indicating that the user is a member of a network of authorized users.

10. The method of claim 1, wherein the providing the user with the indication that the user is authorized to use the parking space comprises printing a receipt at the EVCS or EVSE, the receipt indicating that the user is authorized to use the parking space for the desired period.

11. The method of claim 1, wherein the controlling the charging operation comprises:
receiving account information from the user;
detecting an unplug event at the parking space;
determining a time of the unplug event;
computing a cost for parking and charging at the parking space based at least in part on the time of the unplug event; and
transmitting the cost for parking and charging at the parking space and at least a portion of the account information to a remote server.

12. The method of claim 1, further comprising displaying one or more advertisements on a display device of the EVCS or EVSE as the EVCS or EVSE awaits user interaction.

13. The method of claim 1, further comprising:
receiving payment method information from the user;

selecting one or more targeted advertisements for display on a display device of the EVCS or EVSE, the one or more targeted advertisements being selected based at least in part on the payment method information; and displaying the one or more targeted advertisements on the display device of the EVCS or EVSE.

14. One or more non-transitory computer-readable media storing computer-executable instructions which when executed by the computer processor cause the computer processor to perform a method, the method comprising:

receiving an indication at an electric vehicle charging station ("EVCS") or electric vehicle supply equipment ("EVSE") of a parking space at which a user of the EVCS or EVSE desires to park;

determining if the parking space indicated by the user is associated with an electric vehicle charging port;

if the parking space indicated by the user is associated with an electric vehicle charging port,
determining whether the user is authorized to use the EVCS or EVSE, and
if the user is authorized to use the EVCS or EVSE, controlling a charging operation that provides an electric charge via the electric vehicle charging port; and if the parking space indicated by the user is not associated with an electric vehicle charging port,
determining whether the user is authorized to use the parking space not associated with the electric vehicle charging port, and
providing the user with an indication that the user is authorized to use the parking space not associated with the electric vehicle charging port.

15. An EVCS or EVSE configured to perform a method, the method comprising:

receiving an indication at the EVCS or EVSE of a parking space at which a user of the EVCS or EVSE desires to park;

determining if the parking space indicated by the user is associated with an electric vehicle charging port;

if the parking space indicated by the user is associated with an electric vehicle charging port,
determining whether the user is authorized to use the EVCS or EVSE, and
if the user is authorized to use the EVCS or EVSE, controlling a charging operation that provides an electric charge via the electric vehicle charging port; and if the parking space indicated by the user is not associated with an electric vehicle charging port,
determining whether the user is authorized to use the parking space not associated with the electric vehicle charging port, and
providing the user with an indication that the user is authorized to use the parking space not associated with the electric vehicle charging port.

16. An electric vehicle charging station ("EVCS") or electric vehicle supply equipment ("EVSE") comprising:

a charging port configured to be coupled to an electric vehicle and to charge one or more batteries of the electric vehicle;
a display device;
a computer processor; and
one or more non-transitory computer-readable media storing computer-executable instructions which when executed by the computer processor cause the display device to:
display an interactive parking space selection screen by which an available parking space not associated with any charging port is selectable;

display an interactive parking duration selection screen by which a duration for parking in the available parking space not associated with any charging port is selectable;

display an interactive authorization selection screen by which a method for authorizing the parking in the available parking space not associated with any charging port is selectable; and display an authorization accepted screen indicating that parking in the available parking space not associated with any charging port is authorized.

17. The EVCS or EVSE of claim 16, wherein the display device comprises a touch screen interface.

18. The EVCS or EVSE of claim 16, wherein the interactive parking space selection screen includes graphical depictions of a plurality of available parking spaces, at least some of the graphical depictions indicating that an associated parking space has a respective charging port for charging an electric vehicle.

19. The EVCS or EVSE of claim 16, wherein the computer-executable instructions, when executed by the computer processor, cause the interactive authorization selection screen to request an authorization method from a user from among a plurality of possible authorization methods.

20. The EVCS or EVSE of claim 19, wherein the possible authorization methods comprise at least a credit card authorization and a network membership authorization.

21. The EVCS or EVSE of claim 16, wherein the computer-executable instructions, when executed by the computer processor,
cause transmission of user identification information to a remote server; and
process data received from the remote server in response to the transmission, the data received being indicative of whether parking in the available parking space is authorized.

22. The EVCS or EVSE of claim 21, wherein the EVCS or EVSE further comprises a printer, and
wherein the computer-executable instructions, when executed by the computer processor, cause the printer to print a receipt indicating that parking at the available parking space is authorized for the duration selected by a user.

23. The EVCS or EVSE of claim 21, wherein the user identification information is credit card information for a user, and
wherein the data received from the remote server indicates that a credit card charge for the user has been authorized by the remote server.

24. The EVCS or EVSE of claim 21, wherein the data received from the remote server indicates that a user is a member of a network of authorized users, and
wherein the computer-executable instructions, when executed by the computer processor, cause transmission of the duration for parking selected by the user.

25. The EVCS or EVSE of claim 16, wherein the computer-executable instructions, when executed by the computer processor, cause one or more advertisements to be displayed on the display device.

26. The EVCS or EVSE of claim 25, wherein the advertisements are selected advertisements targeting a user of the EVCS or EVSE based on information received from the user from the interactive authorization selection screen.

27. The EVCS or EVSE of claim 16, wherein the computer-executable instructions, when executed by the computer processor, cause the display device to display an interactive receipt request screen by which a receipt for the parking in the available parking space is requestable.

28. The EVCS or EVSE of claim 27, wherein the computer-executable instructions, when executed by the computer processor, cause the receipt for the parking in the available parking space to be emailed to the user upon request.

29. A method, comprising:
with computing hardware,
receiving user account data from an electric vehicle charging station ("EVCS") or from electric vehicle supply equipment ("EVSE") in a system of EVCSs or EVSE;
accessing a user database;
based on at least a portion of the account information, determining from the user database that a user associated with the account information is authorized to use the EVCS or EVSE;
transmitting authorization data to the EVCS or EVSE, the authorization data indicating that the user is authorized to use the EVCS or EVSE;
receiving from the EVCS or EVSE an indication of a parking fee to be charged to the user; and
updating the user database to account for the parking fee.

30. The method of claim 29, further comprising:
with the computing hardware,
receiving from the EVCS or EVSE an indication of energy used by the user at the EVCS or EVSE;
computing an electric vehicle charging fee based at least in part on the indication of energy used by the user; and
updating the user database to account for the electric vehicle charging fee.

31. The method of claim 29, further comprising:
with the computing hardware,
receiving from the EVCS or EVSE an indication of an electric vehicle charging fee to be charged to the user; and
updating the user database to account for the electric vehicle charging fee.

32. One or more non-transitory computer-readable media storing computer-executable instructions which when executed by the computer processor cause the computer processor to perform a method, the method comprising:
receiving user account data from an electric vehicle charging station ("EVCS") or from electric vehicle supply equipment ("EVSE") in a system of EVCSs or EVSE;
accessing a user database;
based on at least a portion of the account information, determining from the user database that a user associated with the account information is authorized to use the EVCS or EVSE;
transmitting authorization data to the EVCS or EVSE, the authorization data indicating that the user is authorized to use the EVCS or EVSE;
receiving from the EVCS or EVSE an indication of a parking fee to be charged to the user; and
updating the user database to account for the parking fee.

33. A method, comprising:
with computing hardware,
receiving user account data from an electric vehicle charging station ("EVCS") or from electric vehicle supply equipment ("EVSE") in a system of EVCSs or EVSE;
accessing a user database;
based on at least a portion of the account information, determining from the user database that a user associated with the account information is authorized to park at a parking space managed by the EVCS or EVSE and not associated with any charging port in the system of EVCs or EVSE;
transmitting authorization data to the EVCS or EVSE, the authorization data indicating that the user is authorized to park at the parking space managed by the EVCS or EVSE and not associated with any charging port in the system of EVCs or EVSE.

34. The method of claim 33, further comprising:
with the computing hardware,
receiving from the EVCS or EVSE an indication of a parking fee to be charged to the user; and
updating the user database to account for the parking fee.

35. One or more non-transitory computer-readable media storing computer-executable instructions which when executed by the computer processor cause the computer processor to perform a method, the method comprising:
receiving user account data from an electric vehicle charging station ("EVCS") or from electric vehicle supply equipment ("EVSE") in a system of EVCSs or EVSE;
accessing a user database;
based on at least a portion of the account information, determining from the user database that a user associated with the account information is authorized to park at a parking space managed by the EVCS or EVSE and not associated with any charging port in the system of EVCs or EVSE;
transmitting authorization data to the EVCS or EVSE, the authorization data indicating that the user is authorized to park at the parking space managed by the EVCS or EVSE and not associated with any charging port in the system of EVCs or EVSE.

36. A method, comprising:
using computing hardware,
receiving parking rate data from a user, the parking rate data comprising one or more parking rates to be charged by one or more electric vehicle charging stations ("EVCSs") or instances of electric vehicle supply equipment ("EVSE") in a system of EVCSs or EVSE, the one or more parking rates including a rate for parking at a parking space not associated with an electric vehicle charging port; and
causing the parking rate data to be transmitted to the one or more EVCS or instances of EVSE.

37. The method of claim 36, wherein the one or more EVCS or instances of EVSE are a subset of the EVCSs or EVSE in the system of EVCSs or EVSE.

38. The method of claim 36, wherein the parking rate data further comprises identification data for identifying one or more EVCSs or instances of EVSE which are to use the one or more parking rates.

39. One or more non-transitory computer-readable media storing computer-executable instructions which when executed by the computer processor cause the computer processor to perform a method, the method comprising:
receiving parking rate data from a user, the parking rate data comprising one or more parking rates to be charged by one or more electric vehicle charging stations ("EVCSs") or instances of electric vehicle supply equipment ("EVSE") in a system of EVCSs or EVSE, the one or more parking rates including a rate for parking at a parking space not associated with an electric vehicle charging port; and
causing the parking rate data to be transmitted to the one or more EVCS or instances of EVSE.

40. The one or more non-transitory computer-readable media of claim 14, wherein the receiving comprises receiving the indication of the parking space at which the user of the EVCS or EVSE desires to park via a touch screen interface associated with a display device of the EVCS or EVSE.

41. The one or more non-transitory computer-readable media of claim 14, wherein the method further comprises displaying graphical depictions of parking spaces managed by the EVCS or EVSE on a display device of the EVCS or EVSE, and
wherein the receiving comprises receiving data indicating user interaction with one of the graphical depictions via a touch screen interface associated with the display device.

42. The one or more non-transitory computer-readable media of claim 14, wherein the determining whether the user is authorized to use the EVCS or EVSE comprises:
receiving account information from the user;
accessing user data stored locally at the EVCS or EVSE; and
determining that the user is authorized to use the EVCS or EVSE by using the account information to identify the user as an authorized user from the user data.

43. The one or more non-transitory computer-readable media of claim 14, wherein the determining whether the user is authorized to use the EVCS or EVSE comprises:
receiving account information from the user;
transmitting at least a portion of the account information to a remote server; and
receiving a response from the remote server.

44. The one or more non-transitory computer-readable media of claim 43, wherein the account information is either credit card account information or account information indicating that the user is a member of a network of authorized users.

45. The one or more non-transitory computer-readable media of claim 14, wherein the determining whether the user is authorized to use the parking space comprises:
receiving an indication of a period for which the user desires to park;
receiving account information from the user;
accessing user data stored locally at the EVCS or EVSE; and
determining that the user is authorized to use the parking space by using the account information and the indication of the period to identify the user as an authorized user from the user data.

46. The one or more non-transitory computer-readable media of claim 14, wherein the determining whether the user is authorized to use the parking space comprises:
receiving an indication of a period for which the user desires to park;
receiving account information from the user;
determining a cost for parking for the desired period using locally stored parking rate information; and
transmitting the cost for parking and at least a portion of the account information to a remote server.

47. The one or more non-transitory computer-readable media of claim 46, wherein the account information is either credit card account information or account information indicating that the user is a member of a network of authorized users.

48. The one or more non-transitory computer-readable media of claim 14, wherein the providing the user with the indication that the user is authorized to use the parking space comprises printing a receipt at the EVCS or EVSE, the receipt indicating that the user is authorized to use the parking space for the desired period.

49. The one or more non-transitory computer-readable media of claim 14, wherein the controlling the charging operation comprises:
receiving account information from the user;
detecting an unplug event at the parking space;
determining a time of the unplug event;
computing a cost for parking and charging at the parking space based at least in part on the time of the unplug event; and
transmitting the cost for parking and charging at the parking space and at least a portion of the account information to a remote server.

50. The one or more non-transitory computer-readable media of claim 14, further comprising displaying one or more advertisements on a display device of the EVCS or EVSE as the EVCS or EVSE awaits user interaction.

51. The one or more non-transitory computer-readable media of claim 14, further comprising:
receiving payment method information from the user;
selecting one or more targeted advertisements for display on a display device of the EVCS or EVSE, the one or more targeted advertisements being selected based at least in part on the payment method information; and
displaying the one or more targeted advertisements on the display device of the EVCS or EVSE.

52. The one or more non-transitory computer-readable media of claim 32, wherein the method further comprises:
receiving from the EVCS or EVSE an indication of energy used by the user at the EVCS or EVSE;
computing an electric vehicle charging fee based at least in part on the indication of energy used by the user; and
updating the user database to account for the electric vehicle charging fee.

53. The one or more non-transitory computer-readable media of claim 32, wherein the method further comprises:
receiving from the EVCS or EVSE an indication of an electric vehicle charging fee to be charged to the user; and
updating the user database to account for the electric vehicle charging fee.

54. The one or more non-transitory computer-readable media of claim 35, wherein the method further comprises:
receiving from the EVCS or EVSE an indication of a parking fee to be charged to the user; and
updating the user database to account for the parking fee.

* * * * *